(12) United States Patent
Yokokawa et al.

(10) Patent No.: US 8,488,695 B2
(45) Date of Patent: Jul. 16, 2013

(54) RECEIVING APPARATUS AND METHOD, PROGRAM, AND RECEIVING SYSTEM

(75) Inventors: Takashi Yokokawa, Kanagawa (JP); Tadaaki Yuba, Tokyo (JP); Hidetoshi Kawauchi, Kanagawa (JP); Hitoshi Sakai, Kanagawa (JP); Yuken Goto, Tokyo (JP); Suguru Houchi, Tokyo (JP)

(73) Assignee: Sony Corporation, Tokyo (JP)

( * ) Notice: Subject to any disclaimer, the term of this patent is extended or adjusted under 35 U.S.C. 154(b) by 277 days.

(21) Appl. No.: 12/958,912

(22) Filed: Dec. 2, 2010

(65) Prior Publication Data
US 2011/0142176 A1 Jun. 16, 2011

(30) Foreign Application Priority Data
Dec. 15, 2009 (JP) ................................ 2009-283759

(51) Int. Cl.
*H04K 1/10* (2006.01)
(52) U.S. Cl.
USPC ........... 375/260; 375/262; 375/265; 375/267; 375/341; 375/343; 375/346; 375/347; 375/350
(58) Field of Classification Search
USPC ................. 375/260, 340, 262, 265, 267, 343, 375/346, 347, 350; 370/203, 204, 205, 208, 370/209, 210
See application file for complete search history.

(56) References Cited

U.S. PATENT DOCUMENTS

| | | | | |
|---|---|---|---|---|
| 5,852,630 | A * | 12/1998 | Langberg et al. | ............. 375/219 |
| 8,212,944 | B2 * | 7/2012 | Touzni et al. | ................. 348/731 |
| 8,310,601 | B2 * | 11/2012 | Ahluwalia et al. | ............ 348/731 |

OTHER PUBLICATIONS

U.S. Appl. No. 13/236,005, filed Sep. 19, 2011, Kawauchi, et al.
Extended Search Report issued Aug. 31, 2011 in Europe Application No. 10193042.8.
Digital Video Broadcasting (DVB); "Frame structure channel coding and modulation for a second generation digital terrestrial television broadcasting system (DVB-T2)", European Standard (Telecommunications Series), Final Draft ETSI EN 302 755 V1.1.1, Jul. 2009, pp. 1-167.
Alberto Vigato, et al., "Coded Decision Directed Demodulation for Second Generation Digital Video Broadcasting Standard", IEEE Transactions on Broadcasting, vol. 55, No. 3, Sep. 2009, pp. 607-615.
Digital Video Broadcating (DVB); Frame structure channel coding and modulation for second generation digital terrestrial television broadcasting system (DVB-T2), Jun. 2010, 179 pages.

* cited by examiner

*Primary Examiner* — Dhaval Patel
(74) *Attorney, Agent, or Firm* — Oblon, Spivak, McClelland, Maier & Neustadt, L.L.P.

(57) ABSTRACT

A receiving apparatus for receiving an orthogonal frequency division multiplexing (OFDM) signal including a frame having one frame length of a plurality of patterns. The apparatus comprises an acquiring section to acquire information regarding a preamble signal from an OFDM signal from a transmitting apparatus; a frame determining section to determine whether the one frame length is short in the frame based on the information regarding the acquired preamble signal; and a time interpolating section to obtain transmission path characteristics by comparing a pilot contained in the preamble signal with a known pilot corresponding to the pilot in a phase of transmission, when the frame determining section determines that the one frame length is short in the frame, and to interpolate a data portion in a time direction based on transmission path characteristics.

12 Claims, 20 Drawing Sheets

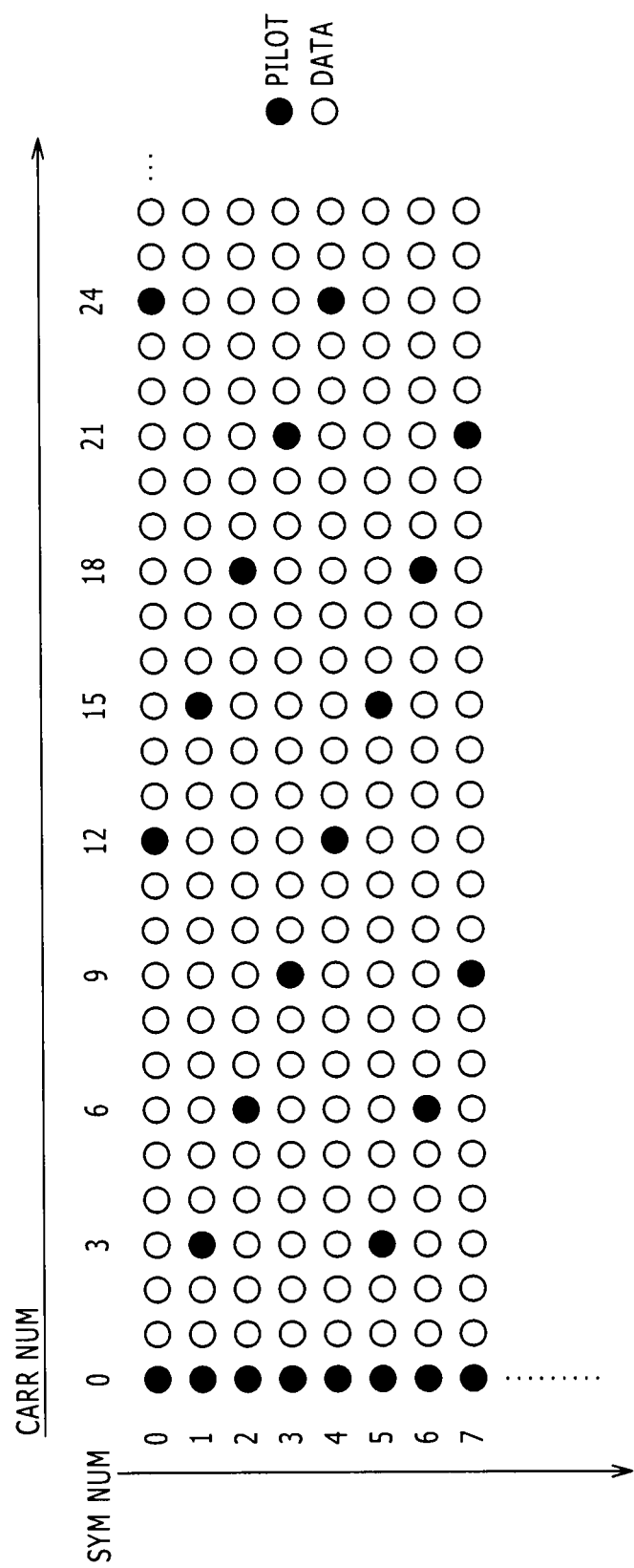
F I G. 1

FIG.3

|     | Dx | Dy |
|-----|----|----|
| PP1 | 3  | 4  |
| PP2 | 6  | 2  |
| PP3 | 6  | 4  |
| PP4 | 12 | 2  |
| PP5 | 12 | 4  |
| PP6 | 24 | 2  |
| PP7 | 24 | 4  |
| PP8 | 6  | 16 |

FIG. 6

| FFT SIZE | GI1/128 | GI1/32 | GI1/16 | GI19/256 | GI1/8 | GI19/128 | GI1/4 | REMARKS |
|---|---|---|---|---|---|---|---|---|
| 32K | 68 | 66 | 64 | 64 | 60 | 60 | NA | Lf IS EVEN NUMBER |
| 16K | 138 | 135 | 131 | 129 | 123 | 121 | 111 | |
| 8K | 276 | 270 | 262 | 259 | 247 | 242 | 223 | |
| 4K | NA | 540 | 524 | NA | 495 | NA | 446 | |
| 2K | NA | 1081 | 1049 | NA | 991 | NA | 892 | |
| 1K | NA | NA | 2098 | NA | 1982 | NA | 1784 | |

FIG. 7

| FFT SIZE | Lf | REMARKS |
|---|---|---|
| 32K | Np2+3 | Lf IS EVEN NUMBER |
| OTHERS | Np2+7 | |

FIG. 8

| FFT SIZE | PP | Np2 | NDSYM | REMARKS |
|---|---|---|---|---|
| 32K | PP8 | 1 | 3~13 | Lf(=Np2+NDSYM) IS EVEN NUMBER |
| 16K | PP8 | 1 | 7~14 | |
| 8K | PP8 | 2 | 7~13 | |

FIG.12

|  | POSITION OF P2 PILOT |
|---|---|
| FFTSIZE 32K, SISO | k mod 6 == 0 |
| OTHERS | k mod 3 == 0 |

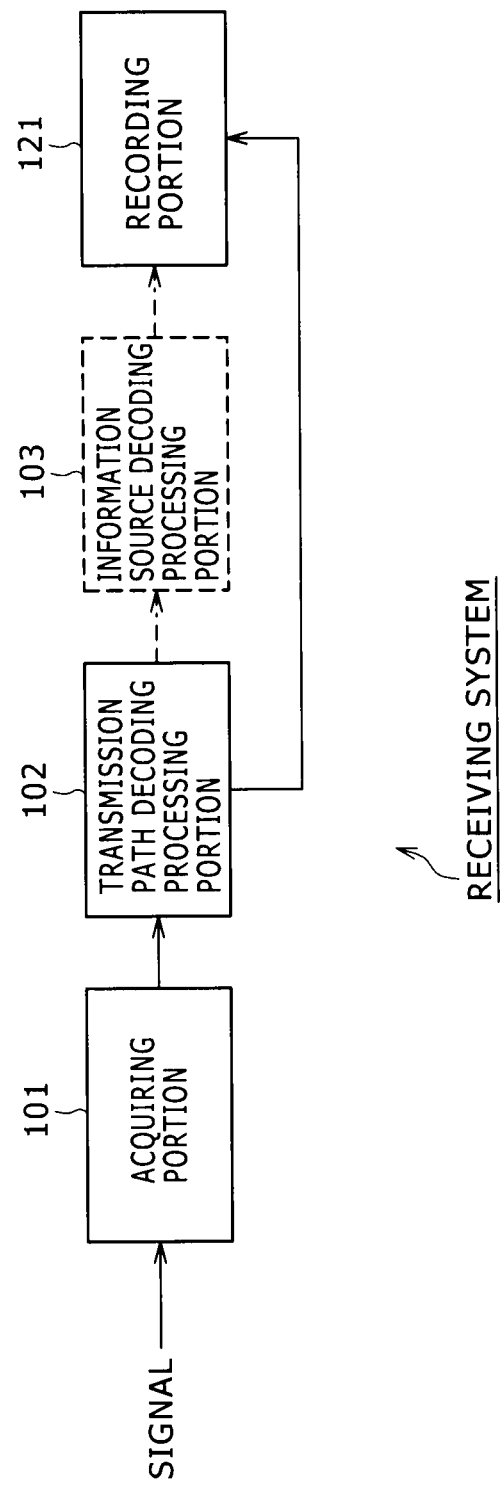

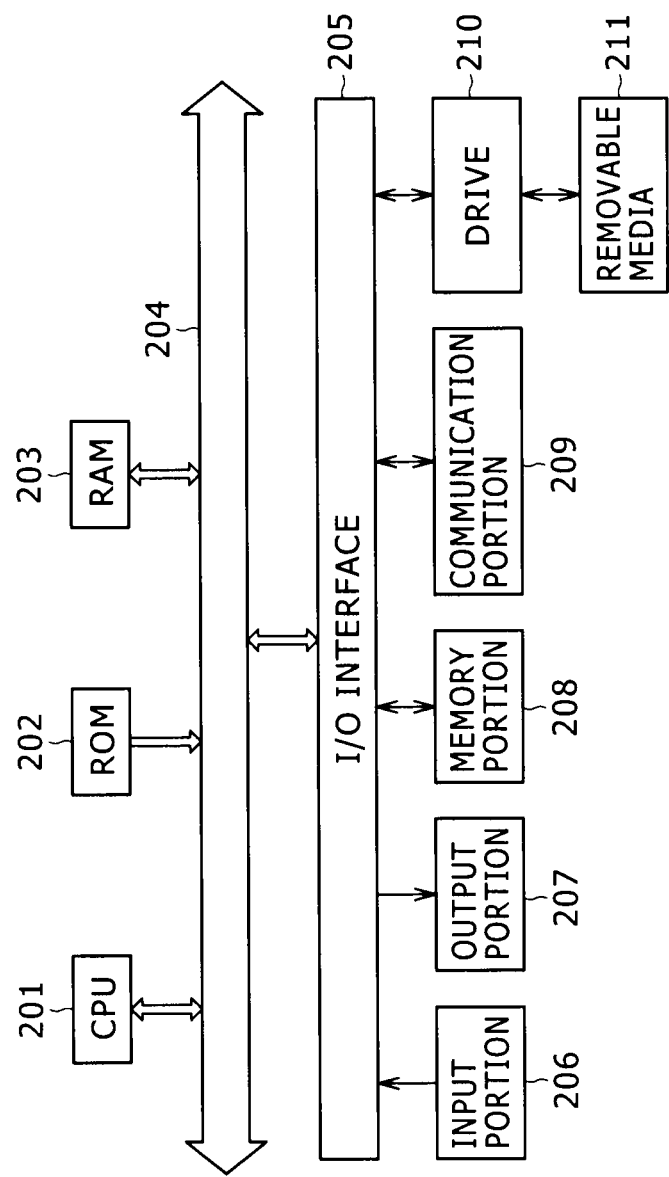

RECEIVING APPARATUS AND METHOD, PROGRAM, AND RECEIVING SYSTEM

BACKGROUND OF THE INVENTION

1. Field of the Invention

The present invention relates to a receiving apparatus and a receiving method, a program, and a receiving system, and more particularly to a receiving apparatus and a receiving method each of which can precisely estimate a transmission path even in the case of a frame in which one frame length is short, a program, and a receiving system.

2. Description of the Related Art

In recent years, a modulation system called an orthogonal frequency division multiplexing (OFDM) system has been used as a system for transmitting a digital signal. The OFDM system is a system in which a large number of orthogonal subcarriers are prepared within a transmission band, and data is allocated to amplitudes and phases of respective subcarriers, thereby carrying out digital modulation in accordance with either Phase Shift Keying (PSK) or Quadrature Amplitude Modulation (QAM). An OFDM time domain signal is transmitted in units of a symbol called an OFDM symbol.

The OFDM system is applied to a terrestrial digital broadcasting which strongly receives an influence of a multipath interference in many cases. For example, the standards such as a Digital Video Broadcasting-Terrestrial (DVB-T) and an Integrated Services Digital Broadcasting-Terrestrial (ISDB-T) are known as the standards for the terrestrial digital broadcasting adopting such an OFDM system.

In a transmission system adopting such an OFDM system, a known signal called a Scattered Pilot (SP) is inserted into the data.

FIG. 1 shows a pattern of arrangement of pilots within the OFDM symbol. In an example of FIG. 1, one circle mark represents one OFDM symbol. Also, an axis of abscissa represents a carrier number (carr num) of the OFDM signal, and an axis of ordinate represents a symbol number (sym num) of the OFDM signal. In addition, an open circle mark represents data (carrier) becoming an object of the transmission, and a back circle mark represents a pilot (either an Edge pilot or an SP). That is to say, the pilots located in the carriers each having a carrier number 0 are the Edge pilots.

As shown in FIG. 1, in the OFDM symbol, the SP is inserted once every 12 carriers in a carrier direction, and is inserted once every 4 symbols in a symbol direction. Also, one frame length is decided as 68 symbols in the DVB-T, and is decided as 204 symbols in the ISDM-T.

In the receiving apparatus in such a transmission system, a method of carrying out an interpolation in a time direction by using the SPs arranged in the same carrier, thereby carrying out estimation of a transmission path is generally known.

FIG. 2 shows an example after completion of the time interpolation made by using the SPs shown in FIG. 1. In the example of FIG. 2, hatched portions (for example, carrier numbers 0, 3, 6, 9, . . . ) represent the respective carriers interpolated by using the SPs.

Now, at the present time (as of May, 2009), Digital Video Broadcasting (DVB)-T.2 is being enacted as the standard of the next generation terrestrial digital broadcasting by the European Telecommunication Standard Institute (ETSI). This is described in a Non-Patent Document of DVB Blue-Book A122 Rev. 1, Frame structure channel coding and modulation for a second generation digital terrestrial television broadcasting system (DVB-T2) Sep. 1, 2008, home page of DVB, [retrieved on Nov. 10, 2009], the Internet <URL: http://www.dvb.org/technology/standards/].

In the DVB-T2, unlike the DVB-T or the ISDB-T, the arrangement of the SPs is not unique. As shown in FIGS. 3 to 5, the arrangement of the SPs inserted into the data is decided from PP1 to PP8 as a Pilot Pattern (PP).

FIG. 3 and FIGS. 4A to 4H show examples of the arrangement of the SPs in PP1 to PP8. Character Dx in FIG. 3 represents a time interpolation interval, character Dy represents a symbol interval of the SPs in the same carrier, and Dx×Dy represents an interval of the SPs appearing in the same symbol. Each of the examples of FIGS. 4A to 4H is similar to that of FIG. 1. That is, an open circle mark represents the data becoming an object of the transmission, and a black circle mark represents the pilot (either the Edge pilot or the SP).

In the case of PP1 shown in FIG. 4A, Dx=3, Dy=4, and Dx×Dy=12. When the carrier number 0 is excluded because the Edge pilots are arranged in the carrier number 0, the SPs are respectively arranged in the symbols having the symbol numbers 0, 4 . . . in the carrier numbers 12, 24, . . . , and in the symbols having the symbol numbers 1, 5, 9, . . . in the carrier numbers 3, 15, . . . . In addition, the SPs are respectively arranged in the symbols having the symbol numbers 2, 6, . . . in the carrier numbers 6, 18, . . . , and in the symbols having the symbol numbers 3, 7, . . . in the carrier numbers 9, 21, . . . .

In the case of PP2 shown in FIG. 4B, Dx=6, Dy=2, and Dx×Dy=12. When the carrier number 0 is excluded because the Edge pilots are arranged in the carrier number 0, the SPs are respectively arranged in the symbols having the symbol numbers 0, 2, 4, 6, . . . in the carrier numbers 12, 24, . . . , and in the symbols having the symbol numbers 1, 3, 5, 7, . . . in the carrier numbers 6, 18, . . . .

In the case of PP3 shown in FIG. 4C, Dx=6, Dy=4, and Dx×Dy=24. When the carrier number 0 is excluded because the Edge pilots are arranged in the carrier number 0, the SPs are respectively arranged in the symbols having the symbol numbers 0, 4, . . . in the carrier numbers 24, 48, . . . and in the symbols having the symbol numbers 1, 5, . . . in the carrier numbers 6, 30, . . . . In addition, the SPs are respectively arranged in the symbols having the symbol numbers 2, 6, . . . in the carrier numbers 12, 36, . . . , and in the symbols having the symbol numbers 3, 7, . . . in the carrier numbers 18, 42, . . . .

In the case of PP4 shown in FIG. 4D, Dx=12, Dy=2, and Dx×Dy=24. When the carrier number 0 is excluded because the Edge pilots are arranged in the carrier number 0, the SPs are respectively arranged in the symbols having the symbol numbers 0, 2, 4, 6, . . . in the carrier numbers 24, 48, . . . , and in the symbols having the symbol numbers 1, 3, 5, 7, . . . in the carrier numbers 12, 36, . . . .

In the case of PP5 shown in FIG. 4E, Dx=12, Dy=4, and Dx×Dy=48. When the carrier number 0 is excluded because the Edge pilots are arranged in the carrier number 0, the SPs are respectively arranged in the symbols having the symbol numbers 0, 4 . . . in the carrier numbers 48, 96, . . . , and in the symbols having the symbol numbers 1, 5, . . . in the carrier numbers 12, 60, . . . . In addition, the SPs are respectively arranged in the symbols having the symbol numbers 2, 6, . . . in the carrier numbers 24, 72, . . . , and in the symbols having the symbol numbers 3, 7, . . . in the carrier numbers 36, 84, . . . .

In the case of PP6 shown in FIG. 4F, Dx=24, Dy=2, and Dx×Dy=48. When the carrier number 0 is excluded because the Edge pilots are arranged in the carrier number 0, the SPs are respectively arranged in the symbols having the symbol numbers 0, 2, 4, 6, . . . in the carrier numbers 48, 96, . . . , and in the symbols having the symbol numbers 1, 3, 5, 7, . . . in the carrier numbers 24, 72, . . . .

In the case of PP7 shown in FIG. 4G, Dx=24, Dy=4, and Dx×Dy=96. When the carrier number 0 is excluded because the Edge pilots are arranged in the carrier number 0, the SPs are respectively arranged in the symbols having the symbol numbers 0, 4, . . . in the carrier numbers 96, 192, . . . and in the symbols having the symbol numbers 1, 5, . . . and in the carrier numbers 24, 120, . . . . In addition, the SPs are respectively arranged in the symbols having the symbol numbers 2, 6, . . . in the carrier numbers 48, 144, . . . , and in the symbols having the symbol numbers 3, 7, . . . in the carrier numbers 72, 168, . . . .

In the case of PP8 shown in FIG. 4H, Dx=6, Dy=16, and Dx×Dy=96. When the carrier number 0 is excluded because the Edge pilots are respectively arranged in the carrier number 0, the SPs are respectively arranged in the symbols having the symbol numbers 0, 16, . . . in the carrier numbers 96, 192, . . . , and in the symbols having the symbol numbers 1, 17, . . . in the carrier numbers 6, 102, . . . . In addition, the SPs are respectively arranged in the symbols having the symbol numbers 2, 18, . . . in the carrier numbers 12, 108, . . . , in the symbols having the symbol numbers 3, 19, . . . in the carrier numbers 18, 144, . . . , and in the symbols having the symbol numbers 4, 20, . . . in the carrier numbers 24, 120, . . . .

In addition, in the case of the DVB-T2, the number of symbols in one frame is decided in its maximum/minimum number of symbols by using an FFT size and a guard interval (GI).

FIG. 5 is a diagram showing a format of a T2 frame. A P1 symbol, a P2 symbol, and a symbol referred to as Normal and a symbol referred to as Flame Closing (FC) (each of them is a data symbol) are arranged in this order in the T2 frame. It is noted that the OFDM symbol is generally composed of an effective symbol as a signal period of time for which the IFFT is carried out in a phase of modulation, and a guard interval (GI) in which a part of a waveform of the second half of the effective symbol is copied to the head of the effectively symbol as it is. In FIG. 5, a narrow portion represents the guard interval, and the P1 symbol does not have GI.

The number (Np1) of P1 symbols in one frame is set as one symbol. The number (Np2) of P2 symbols in one frame is set depending on the FFT size. Also, the number (Lf) of symbols in one frame except for P1 is (Np2+NDSYM) (the number of symbols in one frame except for P1 and P2), and its maximum value and minimum value, as shown in FIGS. 6 and 7, are decided by using both the FFT size and the GI.

It is noted that the PP, the FFT size, and the NDSYM are contained in an L1 presignaling of the P2 symbol.

FIG. 6 is a diagram showing a maximum Lf.

The maximum Lf when the FFT size is 32 K is decided in such a way that it is 68 when GI1/128, is 66 when GI1/32, is 64 when GI1/16, is 64 when GI19/256, is 60 when GI1/8, is 60 when GI19/128, and is not applicable (NA) when GI1/4. It is noted that when the FFT size is 32K, Lf is decided as an even number in terms of a remark.

The maximum Lf when the FFT size is 16K is decided in such a way that it is 138 when GI1/128, is 135 when GI1/32, is 131 when GI1/16, is 129 when GI19/256, is 123 when GI1/8, is 121 when GI19/128, and is 111 when GI1/4.

The maximum Lf when the FFT size is 8K is decided in such a way that it is 276 when GI1/128, is 270 when GI1/32, is 262 when GI1/16, is 259 when GI19/256, is 247 when GI1/8, is 242 when GI19/128, and is 223 when GI1/4.

The maximum Lf when the FFT size is 4K is decided in such a way that it is NA when GI1/128, is 540 when GI1/32, is 524 when GI1/16, is NA when GI19/256, is 495 when GI1/8, is NA when GI19/128, and is 446 when GI1/4.

The maximum Lf when the FFT size is 2K is decided in such a way that it is NA when GI1/128, is 1,081 when GI1/32, is 1049 when GI1/16, is NA when GI19/256, is 991 when GI1/8, is NA when GI19/128, and is 892 when GI1/4.

The maximum Lf when the FFT size is 1K is decided in such a way that it is NA when GI1/128, is NA when GI1/32, is 2098 when GI1/16, is NA when GI19/256, is 1,982 when GI1/8, is NA when GI19/128, and is 1,784 when GI1/4.

FIG. 7 is a diagram showing a minimum Lf.

The minimum Lf when the FFT size is 32K is (Np2+3), and Lf is decided as an even number in terms of a remark. The minimum Lf in the case of the FFT size other than 32K is decided as (Np2+7).

As described above, the arrangement of the SPs, and the number of symbols in one frame are decided in the case of the DVB-T2. As a result, Lf(Np2+NDSYM) becomes smaller than Dy, and thus the effective SPs necessary for the time interpolation become insufficient in some cases.

FIG. 8 is a diagram showing a pattern in which Lf(Np2+NDSYM) becomes smaller than Dy.

In the case where the FFT size is 32K and the PP is PP8, when Np2 is 1 and NDSYM is in the range of 3 to 13, Lf(Np2+NDSYM) becomes smaller than Dy. It is noted that in this case, Lf(Np2+NDSYM) is decided as an even number.

In the case where the FFT size is 16K and the PP is PP8, when Np2 is 1 and NDSYM is in the range of 7 to 14, Lf(Np2+NDSYM) becomes smaller than Dy.

In the case where the FFT size is 8K and the PP is PP8, when Np2 is 2 and NDSYM is in the range of 7 to 13, Lf(Np2+NDSYM) becomes smaller than Dy.

It is noted that since when the FFT size is either 2K or 4K, PP8 is not got, the conditions described above are not met. In addition, since the FFT size is 1K, PP8 is not got and thus in the first place, a minimum value of (P2+NDSYM) is 23, the conditions described above are not met.

The frame having such a short one frame length that the number of symbols in one frame except for P1 becomes smaller than the symbol interval of the SPs in the same carrier is called a short frame. Thus, in the case of the short frame, the effective SPs necessary for the time interpolation become insufficient.

FIG. 9 is a diagram showing an example of the time interpolation in the case of the short frame. It is noted that the example of FIG. 9 shows the case where the FFT size is 32K, PP8 (Dx=6, Dy=16, Np2=1), Extended mode, NDSYM=3. In the example of FIG. 9, similarly to the case of FIG. 1, an open circle mark represents the data (carrier) becoming an object of the transmission, and a black circle mark represents the pilot (either the Edge pilot or the SP). However, a dotted circle mark represents the pilot in the P2 symbol. In addition, in the example of FIG. 9, similarly to the case of FIG. 2, a hatched portion represents the carrier which is interpolated by using the SPs.

Although since in the case of this example, Dx=6, Dy=16, and Dx×Dy=96, the decision is made as shown in PP8 of FIG. 4H, only the symbols having the symbol numbers 0 to 3 exist because Np2=1 and NDSYM=3. Therefore, although the SPs are respectively arranged in the carrier numbers 0 to 18, and 96 to 114 each hatched, the SPs are not respectively arranged in the carrier numbers 24 to 90 in a section indicated by A.

That is to say, none of SPs is arranged in the section indicated by A, and thus unlike the case of the carrier numbers 0 to 18 and 96 to 114, it is difficult to carry out the time interpolation.

SUMMARY OF THE INVENTION

As described above, in the case of the short frame, the effective SPs necessary for the time interpolation become insufficient. Although with regard to the measures taken to cope with the insufficiency in the effective SPs, for example, the transmission path estimating method only for the frequency interpolation or the like is expected, in this case, an amount of delay for which the interpolation can be carried out becomes small in the transmission path such as the multipath channel.

The present invention has been made in order to solve the problems described above, and it is therefore desirable to provide a receiving apparatus and a receiving method each of which is capable of precisely carrying out transmission path estimation even in the case of a frame in which one frame length is short, a program, and a receiving system.

In order to attain the desire described above, according to an embodiment of the present invention, there is provided a receiving apparatus for receiving an OFDM signal having a frame having one frame length of a plurality of patterns including: an acquiring section configured to acquire information on a preamble signal from the OFDM signal transmitted from a transmitting apparatus in accordance with an OFDM system; a frame determining section configured to determine whether or not the one frame length is short in the frame based on the information on the preamble signal acquired from the acquiring section; and a time interpolating section configured to obtain transmission path characteristics by comparing a pilot contained in the preamble signal and a known pilot corresponding to the pilot in a phase of transmission with each other when the frame determining section determines that the one frame length is short in the frame, and interpolate a data portion in a time direction based on the transmission path characteristics thus obtained.

The frame in which the one frame length is short is a frame in which the number of symbols in one frame except for other preamble signals each existing before the preamble signal in terms of time is smaller than a symbol interval of the discrete pilots in the same carrier arranged in the data portion.

When the frame determining section determines that the one frame length is not short in the frame, the time interpolating section can obtain the transmission path characteristics by comparing the discrete pilot and the known pilot corresponding to that discrete pilot in the phase of the transmission with each other, and can interpolate the data portion in the time direction based on the transmission path characteristics thus obtained.

When the OFDM signals are MISO-transmitted from the plurality of transmitting apparatuses, and the preamble signal and the discrete pilot in the same carrier are in opposite phase with each other, the time interpolating section can obtain the transmission path characteristics by comparing the pilot contained in the preamble signal in phase with each of the discrete pilots located adjacent to one another at intervals of a predetermined number of carriers, and the known pilot corresponding to that discrete pilot in the phase of the transmission with each other, and can interpolate the data portion in the time direction based on the transmission path characteristics thus obtained.

The information on the preamble signal can be information on the pilot pattern, the FFT size, and the number of OFDM symbols other than the preamble signal contained in one T2 frame.

The OFDM signal is a signal complying with the DVB-T2 standard.

According to another embodiment of the present invention, there is provided a receiving method in a receiving apparatus for receiving an OFDM signal having a frame having one frame length of a plurality of patterns, the receiving method including the steps, carried out by the receiving apparatus, of: acquiring information on a preamble signal from the OFDM signal transmitted from a transmitter in accordance with an OFDM system; determining whether or not the one frame length is short in the frame based on the information thus acquired on the preamble signal; and obtaining transmission path characteristics by comparing a pilot contained in the preamble signal and a known pilot corresponding to the pilot in a phase of transmission with each other when it is determined that the one frame length is short in the frame, and interpolating a data portion in a time direction based on the transmission path characteristics thus obtained.

According to still another embodiment of the present invention, there is provided a program for causing a computer of a receiving apparatus for receiving an OFDM signal having a frame having one of a plurality of patterns to function as: an acquiring section configured to acquire information on a preamble signal from the OFDM signal transmitted from a transmitting apparatus in accordance with an OFDM system; a frame determining section configured to determine whether or not the one frame length is short in the frame based on the information on the preamble signal acquired from the acquiring section; and a time interpolating section configured to obtain transmission path characteristics by comparing a pilot contained in the preamble signal and a known pilot corresponding to the pilot in a phase of transmission with each other when the frame determining section determines that the one frame length is short in the frame, and interpolate a data portion in a time direction based on the transmission path characteristics thus obtained.

According to yet another embodiment of the present invention, there is provided a receiving system for receiving a signal having a frame having one frame length of a plurality of patterns including: an acquiring section configured to acquire the signal through a transmission path; and a transmission path decoding processing portion configured to subject the signal acquired through the transmission path to transmission path decoding processing containing therein at least decoding processing; the transmission path decoding processing portion including: an acquiring section configured to acquire information on a preamble signal from the OFDM signal transmitted from a transmitting apparatus in accordance with an OFDM system; a frame determining section configured to determine whether or not the one frame length is short in the frame based on the information on the preamble signal acquired from the acquiring section; and a time interpolating section configured to obtain transmission path characteristics by comparing a pilot contained in the preamble signal and a known pilot corresponding to the pilot in a phase of transmission with each other when the frame determining section determines that the one frame length is short in the frame, and interpolate a data portion in a time direction based on the transmission path characteristics thus obtained.

According to a further embodiment of the present invention, there is provided a receiving system for receiving a signal having a frame having one frame length of a plurality of patterns including: a transmission path decoding processing portion configured to subject the signal acquired through a transmission path to transmission path decoding processing containing therein at least decoding processing; and an information source decoding processing portion configured to subject the signal which is subjected to at least transmission path decoding processing to processing for expanding compressed information to original information; the transmission path decoding processing portion including: an acquiring section configured to acquire information on a preamble signal from the OFDM signal transmitted from a transmitting apparatus in accordance with an OFDM system; a frame determining section configured to determine whether or not the one frame length is short in the frame based on the information on the preamble signal acquired from the acquiring section; and a time interpolating section configured to obtain transmission path characteristics by comparing a pilot contained in the preamble signal and a known pilot corresponding to the pilot in a phase of transmission with each other when the frame determining section determines that the one frame length is short in the frame, and interpolate a data portion in a time direction based on the transmission path characteristics thus obtained.

According to a still further embodiment of the present invention, there is provided a receiving system for receiving a signal having a frame having one frame length of a plurality of patterns including: a transmission path decoding processing portion configured to subject the signal acquired through a transmission path to transmission path decoding processing containing therein at least decoding processing; and an output portion configured to output either an image or a sound in accordance with the signal which is subjected to the transmission path decoding processing; the transmission path decoding processing portion including: an acquiring section configured to acquire information on a preamble signal from the OFDM signal transmitted from a transmitting apparatus in accordance with an OFDM system; a frame determining section configured to determine whether or not the one frame length is short in the frame based on the information on the preamble signal acquired from the acquiring section; and a time interpolating section configured to obtain transmission path characteristics by comparing a pilot contained in the preamble signal and a known pilot corresponding to the pilot in a phase of transmission with each other when the frame determining section determines that the one frame length is short in the frame, and interpolate a data portion in a time direction based on the transmission path characteristics thus obtained.

According to a yet further embodiment of the present invention, there is provided a receiving system for receiving a signal having a frame having one frame length of a plurality of patterns including: a transmission path decoding processing portion configured to subject the signal acquired through a transmission path to transmission path decoding processing containing therein at least decoding processing; and a recording portion configured to record the signal which is subjected to the transmission path decoding processing; the transmission path decoding processing portion including: an acquiring section configured to acquire information on a preamble signal from the OFDM signal transmitted from a transmitting apparatus in accordance with an OFDM system; a frame determining section configured to determine whether or not the one frame length is short in the frame based on the information on the preamble signal acquired from the acquiring section; and a time interpolating section configured to obtain transmission path characteristics by comparing a pilot contained in the preamble signal and a known pilot corresponding to the pilot in a phase of transmission with each other when the frame determining section determines that the one frame length is short in the frame, and interpolate a data portion in a time direction based on the transmission path characteristics thus obtained.

In the still another embodiment to the yet further embodiment of the present invention as described above, the information on the preamble signal is acquired from the OFDM signal which has the frame having one frame length of a plurality of patterns, and which is transmitted from the transmitting apparatus in accordance with the OFDM system. Also, it is determined whether or not the one frame length is short in the frame in accordance with the information thus acquired on the preamble signal. When it is determined that the one frame length is short in the frame, the transmission path characteristics are obtained by comparing the pilot contained in the preamble signal, and the known pilot corresponding to that preamble signal in the phase of the transmission with each other. Also, the data portion is interpolated in the time direction in accordance with the transmission path characteristics thus obtained.

The receiving apparatus may be either an independent apparatus or an internal block composing one apparatus.

In addition, the program can be provided either by being transmitted through a transmission medium or by being recorded in a recording medium.

According to the embodiment of the present invention, even in the case of the frame in which one frame length is short, it is possible to precisely carry out the time interpolation.

BRIEF DESCRIPTION OF THE DRAWINGS

FIG. 1 is a diagram showing a pattern of arrangement of pilots within an OFDM symbol;

FIG. 3 is a diagram showing a PP in a DVB-T2;

FIG. 6 is a diagram showing a maximum Lf;

FIG. 7 is a diagram showing a minimum Lf;

FIG. 8 is a diagram showing a pattern in which Lf becomes smaller than Dy;

FIG. 12 is a diagram showing carrier arrangement of a P2 pilots in the DVB-T2;

FIG. 19 is a block diagram showing a configuration of a third embodiment of a receiving system to which the embodiment of the present invention shown in FIG. 10 is applied; and FIG. 20 is a block diagram showing a configuration of hardware of a computer.

DETAILED DESCRIPTION OF THE PREFERRED EMBODIMENTS

[Configuration of Recording Apparatus]

Figure 10:
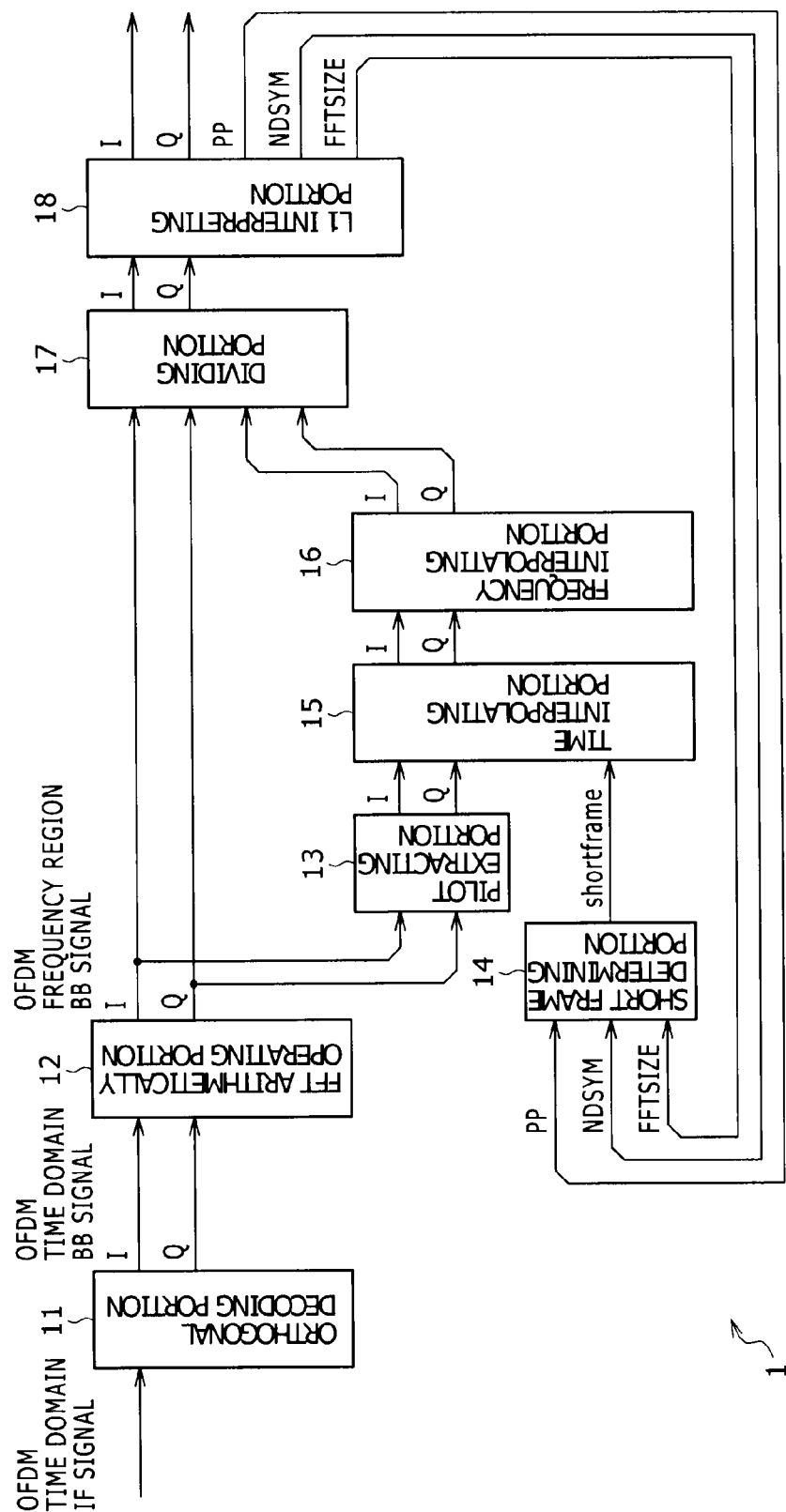
FIG. 10 is a block diagram showing a configuration of an embodiment of a receiving apparatus according to an embodiment of the present invention.

FIG. 10 is a block diagram showing a configuration of an embodiment of a receiving apparatus according to the present invention.

The receiving apparatus 1 includes an orthogonal decoding portion 11, an FFT arithmetically operating portion 12, a pilot extracting portion 13, a short frame determining portion 14, a time interpolating portion 15, a frequency interpolating portion 16, a dividing portion 17, and an L1 interpolating portion 18.

A time domain Intermediate Frequency (IF) signal of an OFDM signal which is transmitted from a transmitting apparatus in accordance with the DVB-T.2 is inputted to the orthogonal decoding portion 11. The orthogonal decoding portion 11 subjects the OFDM signal inputted thereto to digital orthogonal decoding processing by using a carrier (ideally, the same carrier as that used in the transmitting apparatus) having a predetermined frequency (carrier frequency), and a signal orthogonal to the carrier. The orthogonal decoding portion 11 outputs the OFDM signal in the base-band (BB) obtained as a result of the digital orthogonal decoding processing in the form of a decoding result.

Here, the signal outputted in the form of the decoding result is a time domain signal before being subjected to an FFT arithmetic operation by the FFT arithmetically operating portion 12 in a subsequent stage of the orthogonal decoding portion 11 (right after a symbol on an IQ constellation (data which is transmitted by using one subcarrier) is subjected to the IFFT arithmetic operation on the transmitting apparatus side). Thus, the signal outputted in the form of the decoding result will be referred hereinafter to as an OFDM time domain BB signal as well.

After the OFDM time domain BB signal outputted in the form of the decoding result is supplied to an A/D conversion portion (not shown) to be converted from an analog signal into a digital signal, the resulting digital signal is outputted to the FFT arithmetically operating portion 12. The OFDM time domain BB signal is a complex signal expressed by a complex number including a real axis component (In Phase (I) component) and an imaginary axis component (Quadrature Phase (Q) component). Therefore, two arrows are shown in each of the FFT arithmetically operation portion 12 to the L1 interpreting portion 18, to which the respective signals are inputted, in and after the orthogonal decoding portion 11.

The FFT arithmetically operating portion 12 extracts (a sampled value of) the OFDM time domain BB signal for the FF size from the OFDM time domain BB signal in accordance with a trigger position supplied from a P1 symbol processing portion (not shown), and carries out the FFT arithmetic operation for the OFDM time domain BB signal thus extracted.

As a result, ideally, the symbol, having an effective symbol length, except for (the symbol of) the guard interval is extracted from the symbol composing one OFDM symbol contained in the OFDM time domain BB signal to be arithmetically operated.

The information transmitted by using the subcarrier, that is, the OFDM signal representing the symbol on the IQ constellation is obtained in accordance with the FFT arithmetic operation for the OFDM time domain BB signal in the FFT arithmetically operating portion 12.

It is noted that the OFDM signal obtained through the FFT arithmetic operation for the OFDM time domain BB signal is a frequency region signal, and thus, that OFDM signal will be referred hereinafter to as an OFDM frequency region BB signal as well.

The result of the arithmetic operation carried out in the FFT arithmetically operating portion 12 is outputted to each of the pilot extracting portion 13 and the dividing portion 17.

The pilot extracting portion 13 extracts pilots such as a pilot of a P1 symbol as a known signal, a pilot of a P2 symbol, an Edge pilot, and a Scattered Pilot (SP) from the signal after completion of the FFT arithmetic operation, and supplies each of the pilots thus extracted to the time interpolating portion 15.

Information on a pilot pattern (PP), an NDSY (the number of symbols in one frame except for P1 and P2), and an FF size is supplied from the L1 interpolating portion 18 to the short frame determining portion 14. The short frame determining portion 14 determines whether or not a frame being processed is a frame in which the frame length is short (that is, a frame being processed is a short frame) by using the information thus supplied thereto, and supplies the determination result to the time interpolating portion 15.

The time interpolating portion 15 carries out the time interpolation by using the pilot corresponding to the determination result from the short frame determining portion 14. That is to say, the time interpolating portion 15 obtains the transmission path characteristics in the position of the pilot by comparing the pilot thus extracted and the known pilot in a phase of transmission with each other. Also, the time interpolating portion 15 carries out the interpolation in a time direction of (the data portion of) the carrier in which the pilot is arranged every symbol in accordance with the transmission path characteristics thus obtained.

The pilot used here becomes the pilot of the P2 symbol when the determination result represents that the frame being processed is the short frame, and becomes SP when the determination result represents that the frame being processed is not the short frame.

The signal after completion of the time interpolation is outputted to the frequency interpolating portion 16. The frequency interpolating portion 16 shifts (rotates) the position of a frequency interpolating filter so as to correspond to the optimal central position, and subjects the signal after completion of the time interpolation to frequency interpolating filter. The signal after completion of the frequency interpolation is outputted to the dividing portion 17.

The dividing portion 17 equalizes the signal transmitted thereto from the transmitting apparatus by dividing the OFDM frequency range BB signal after completion of the FFT arithmetic operation by the signal after completion of the frequency interpolation. Also, the dividing portion 17 supplies the signal thus equalized to the L1 interpolating portion 18.

The L1 interpolating portion 18 acquires a signal corresponding to the OFDM symbol of P2, and carries out interpretation (decoding) for L1 presignaling and L1 postsignaling, thereby acquiring information on the interpretation. Also, the L1 interpolating portion 18 outputs the signal equalized by the dividing portion 17 to an error correcting portion (not shown) or the like in the subsequent stage of the L1 interpolating portion 18.

The L1 presignaling contains therein information necessary for decoding the L1 postsignaling. The L1 postsignaling contains therein information necessary for each of the receiving apparatuses to access (layer pipes of) a physical layer.

In particular, a guard interval (GI) length, a pilot pattern (PP), representing arrangement of the pilot signals, about in which of the symbols (subcarriers) the pilot signal as the known signal is contained, presence or absence (BWT_EXT) of extension of the transmission band through which the OFDM signal is transmitted, the number of OFDM symbols (NDSYM) contained in one T2 frame, and the like are contained in the L1 presignaling.

In addition, information on in accordance with which of a Single Input Single Output (SISO) system and a Multiple Input, Single Output (MISO) system the same information as that of the transmission parameters of S1 and S2 of the P1 symbol, that is, the P2 symbol is transmitted, the FFT size when the FFT arithmetic operation for the P2 symbol is carried out (the number of samples (symbols) as an object of one FFT arithmetic operation), and the like are also contained in the L1 presignaling.

The L1 interpreting portion 18 supplies the information on the PP, the NDSYM and the FFT size of the information on the L1 presignaling thus interpreted to the short frame determining portion 14.

[Configuration of Short Frame Determining Portion]

Figure 11:
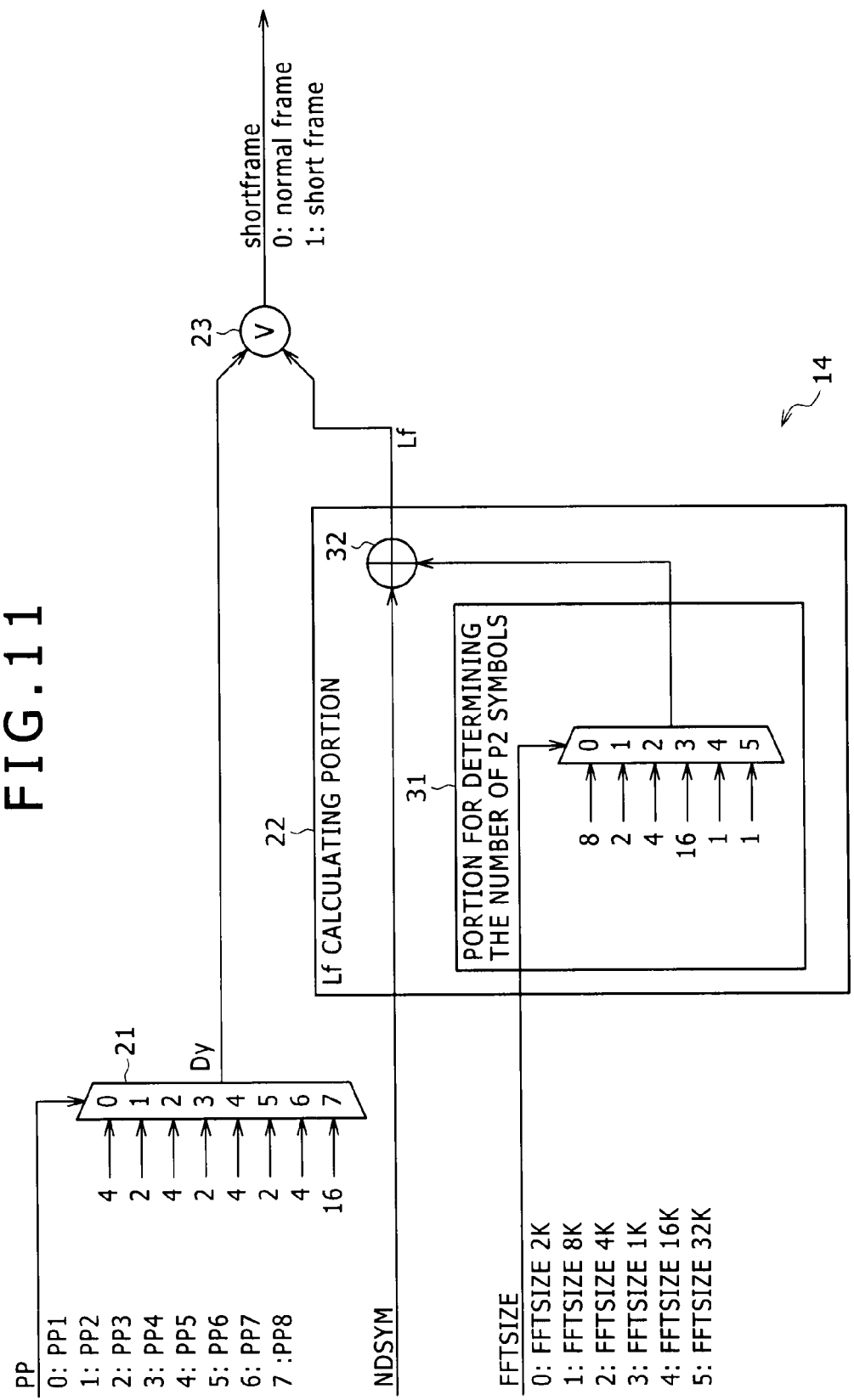
FIG. 11 is a block diagram showing a configuration of a short frame determining portion shown in FIG. 10.

FIG. 11 is a block diagram showing a configuration of the short frame determining portion.

Referring now to FIG. 11, the short frame determining portion 14 includes a Dy determining portion 21, an Lf calculating portion 22, and a comparison determining portion 23.

The information on the PP is inputted from the L1 interpreting portion 18 to the Dy determining portion 21. The Dy determining portion 21 selects a value of Dy corresponding to the pilot pattern inputted thereto (that is, the symbol interval of the SPs in the same carrier), and outputs the value of Dy thus selected to the comparison determining portion 23.

Specifically, PP=0 represents that the pilot pattern is PP1. Therefore, when PP=0 is inputted to the Dy determining portion 21, as shown in PP1 of FIG. 3, the Dy determining portion 21 outputs Dy=4. Since PP=1 represents that the pilot pattern is PP2, when PP=1 is inputted to the Dy determining portion 21, as shown in PP2 of FIG. 3, the Dy determining portion 21 outputs Dy=2. Since PP=2 represents that the pilot pattern is PP3, when PP=2 is inputted to the Dy determining portion 21, as shown in PP3 of FIG. 3, the Dy determining portion 21 outputs Dy=4. Since PP=3 represents that the pilot pattern is PP4, when PP=3 is inputted to the Dy determining portion 21, as shown in PP4 of FIG. 3, the Dy determining portion 21 outputs Dy=2.

Since PP=4 represents that the pilot pattern is PP5, when the PP=4 is inputted to the Dy determining portion 21, as shown in PP5 of FIG. 3, the Dy determining portion 21 outputs Dy=4. Since PP=5 represents that the pilot pattern is PP6, when PP=5 is inputted to the Dy determining portion 21, as shown in PP6 of FIG. 3, the Dy determining portion 21 outputs Dy=2. Since PP=6 represents that the pilot pattern is PP7, when PP=6 is inputted to the Dy determining portion 21, as shown in PP7 of FIG. 3, the Dy determining portion 21 outputs Dy=4. Also, since PP=7 represents that the pilot pattern is PP8, when PP=7 is inputted to the Dy determining portion 21, as shown in PP8 of FIG. 3, the Dy determining portion 21 outputs Dy=16.

The Lf calculating portion 22 includes a portion 31 for determining the number of P2 symbols, and an adding portion 32. The Lf calculating portion 22 calculates a value of the number (Lf) of symbols in one frame except for P1, and outputs the value thus calculated to the comparison determining portion 23.

Information on FFTSIZE is inputted from the L1 interpreting portion 18 to the portion 31 for determining the number of P2 symbols. The number of P2 symbols is decided depending on the FFT size. Therefore, the portion 31 for determining the number of P2 symbols selects the number of P2 symbols corresponding to a value of FFTSIZE inputted thereto, and outputs the number of P2 symbols thus selected to the comparison determining portion 23.

Specifically, since FFTSIZE=0 represents that the FFT size is 2K, when FFTSIZE=0 is inputted to the portion 31 for determining the number of P2 symbols, the portion 31 for determining the number of P2 symbols outputs the number of P2 symbols=8. Since FFTSIZE=1 represents that the FFT size is 8K, when FFTSIZE=1 is inputted to the portion 31 for determining the number of P2 symbols, the portion 31 for determining the number of P2 symbols outputs the number of P2 symbols=2. Also, since FFTSIZE=2 represents that the FFT size is 4K, when FFTSIZE=2 is inputted to the portion 31 for determining the number of P2 symbols, the portion 31 for determining the number of P2 symbols outputs the number of P2 symbols=4.

Since FFTSIZE=3 represents that the FFT size is 1K, when FFTSIZE=3 is inputted to the portion 31 for determining the number of P2 symbols, the portion 31 for determining the number of P2 symbols outputs the number of P2 symbols=16. Since FFTSIZE=4 represents that the FFT size is 16K, when FFTSIZE=4 is inputted to the portion 31 for determining the number of P2 symbols, the portion 31 for determining the number of P2 symbols outputs the number of P2 symbols=1. Also, since FFTSIZE=5 represents that the FFT size is 32K, when FFTSIZE=5 is inputted to the portion 31 for determining the number of P2 symbols, the portion 31 for determining the number of P2 symbols outputs the number of P2 symbols=1.

Information on the NDSYM from the L1 interpreting portion 18, and information on the number of P2 symbols from the portion 31 for determining the number of P2 symbols are both inputted to the adding portion 32. The adding portion 32 adds the values about the two pieces of information inputted thereto to each other, and outputs the number (Lf) of symbols in one frame except for P1 as a value of the addition result to the comparison determining portion 23.

A value of Dy corresponding to the pilot pattern from the Dy determining portion 21, and the number (Lf) of symbols in one frame except for P1 from the adding portion 32 are both inputted to the comparison determining portion 23. The comparison determining portion 23 determines whether or not the current frame being processed is the short frame by comparing both the values with each other. When it is determined that the current frame being processed is the short frame in which Lf is smaller than Dy, the comparison determining portion 23 outputs short frame=1 to the time interpolating portion 15. That is to say, the short frame means a frame in which the number of symbols in one frame except for P1 becomes smaller than the symbol interval of the SPs in the same carrier, and thus one frame length is short.

On the other hand, when it is determined that the current frame being processed is not the short frame in which Lf is not smaller than Dy, and thus is not the short frame, the comparison determining portion 23 outputs short frame=0 (that is, a value representing a normal frame) to the time interpolating portion 15.

[Carrier Arrangement of P2 Pilots in DVB-T2]

FIG. 12 shows the carrier arrangement of the P2 pilots in the DVB-T2.

As shown in FIG. 12, the position of the carrier of the pilot (P2 pilot) in the P2 symbol is decided in such a way that in the case of the SISO system, k mod 6==0 is established only when the FFT size is 32K, and k mod 3==0 is established in other cases.

Here, when the FFT size is 32K, PP1 cannot be got in accordance with the standard of the DVB-T2. From this fact and FIGS. 3 and 12, even when the SPs have any of the pilot patterns (PP), Expression (1) is established:

$$Dx=(\text{mod of } P2P)*n(n=1, 2, 3, \ldots, 8) \quad (1)$$

Therefore, when the P2 pilot is used, the interpolation can be carried out for the carrier of k mod Dx==0 in the time direction. In this case, the interpolation method in the time direction may be either 0-order hold or leak integration, and thus is by no means limited.

[Time Interpolation in Case of Short Frame]

Figure 9:
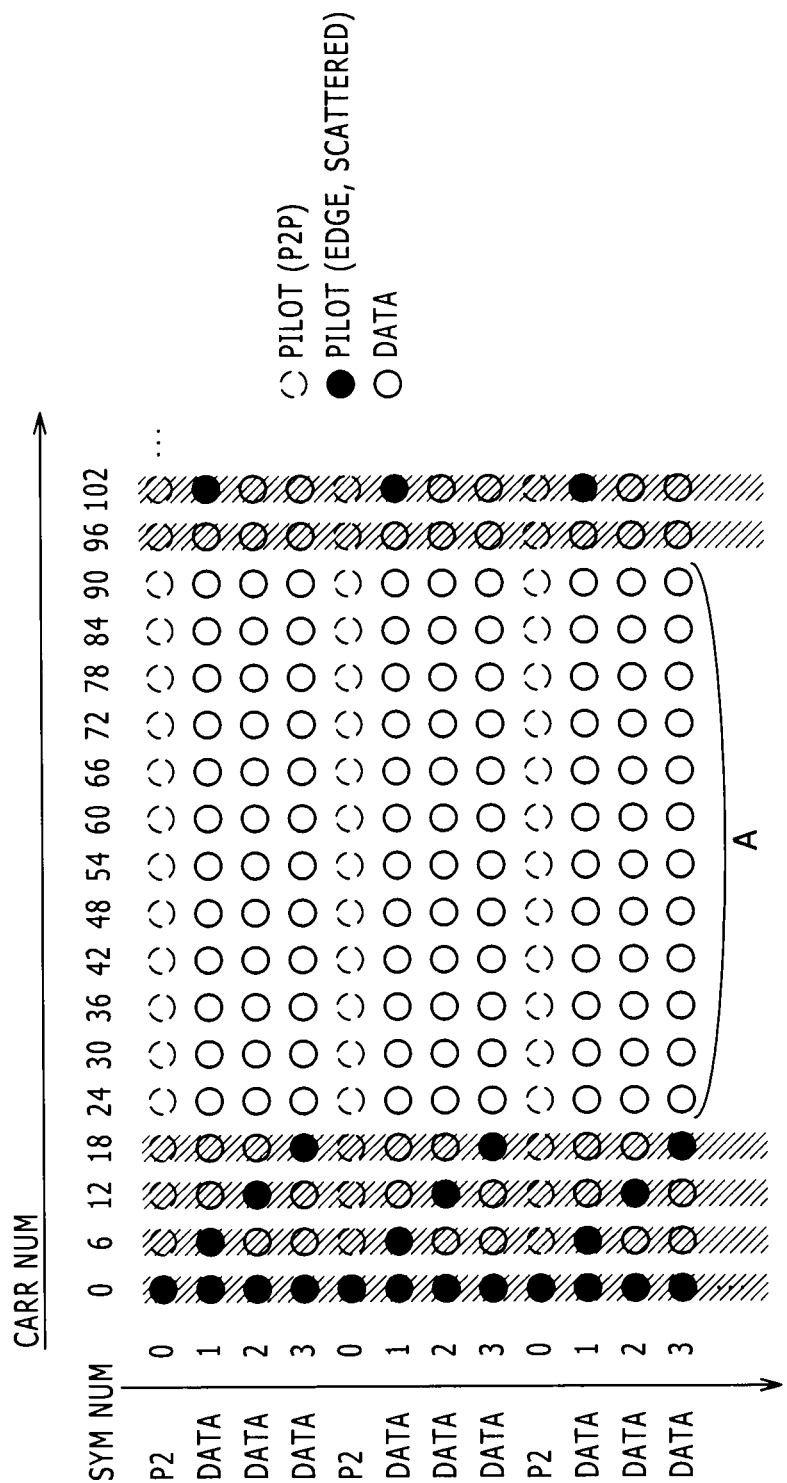
FIG. 9 is a diagram showing an example of existing time interpolation in the case of a short frame.
Figure 13:
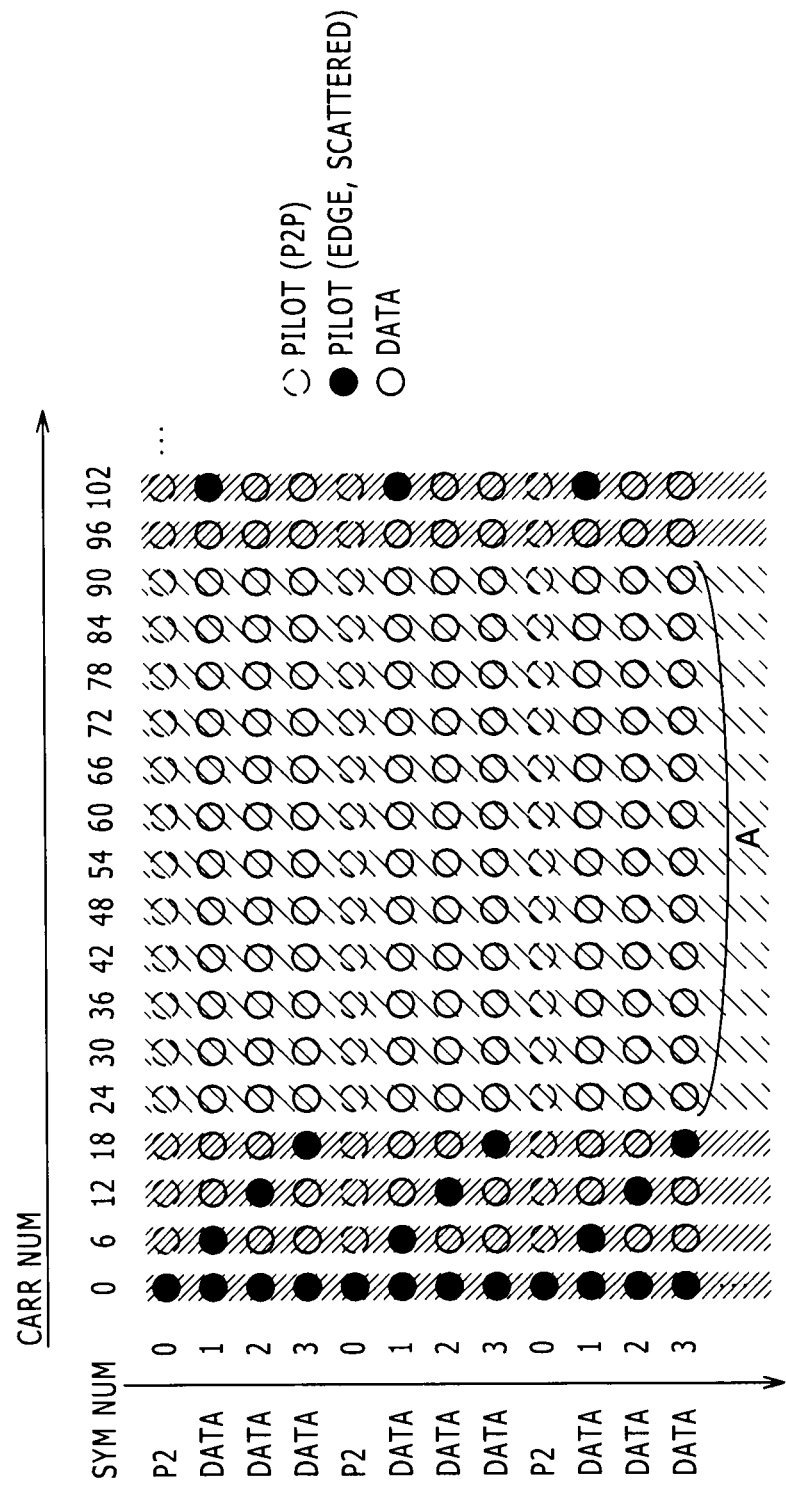
FIG. 13 is a diagram showing time interpolation, in the case of the short frame, made by the receiving apparatus shown in FIG. 10.

FIG. 13 is a diagram showing the time interpolation in the case of the short frame. It is noted that the case of the short frame in which the FFT size is 32K, PP8 (Dx=6, Dy=16, Np2=1), Extended mode, NDSYM=3 is shown in FIG. 13. In the case of FIG. 13, similarly to the case of FIG. 9, the open circle mark represents the data (carrier) becoming an object of the transmission, and the black circle mark represents the pilot (either the Edge pilot or the SP). A dotted circle mark represents the pilot in the P2 symbol. In addition, in the case of FIG. 13, a deeply hatched portion represents the carrier which can be interpolated by using the SP.

Figure 2:
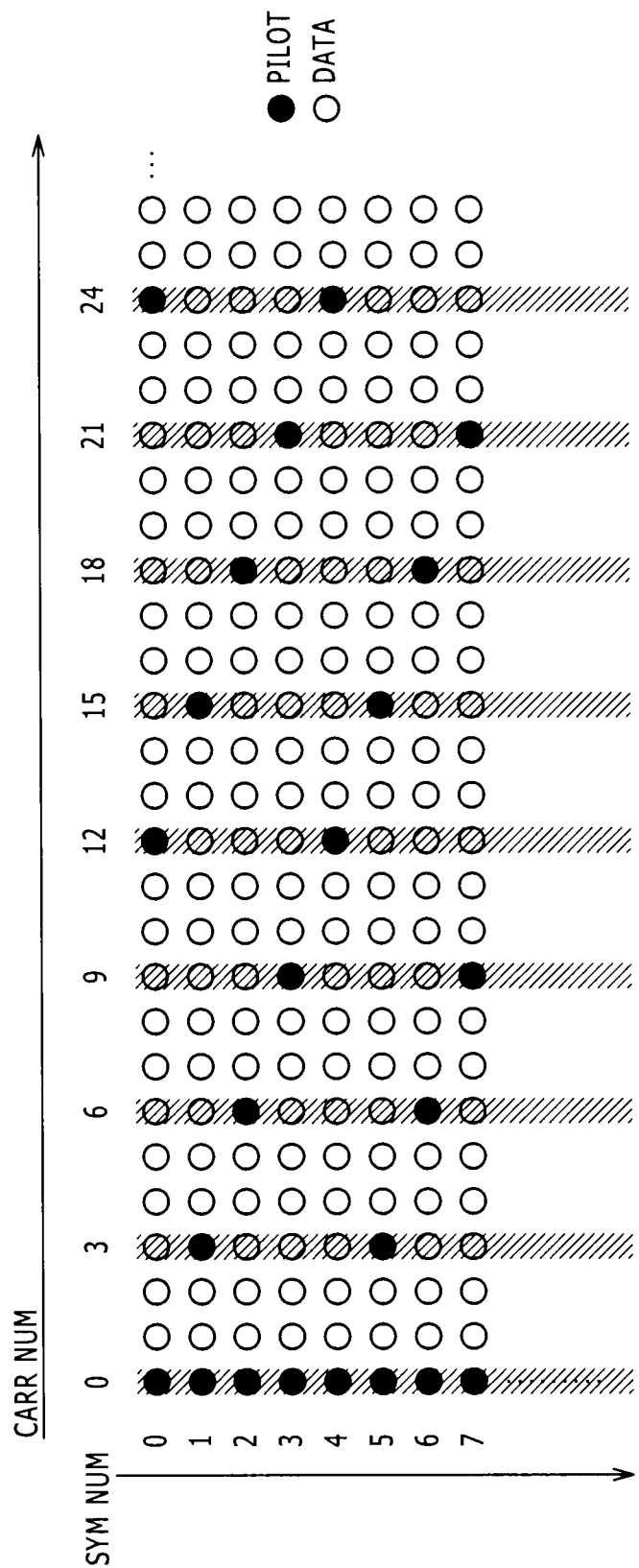
FIG. 2 is a diagram showing an example after completion of time interpolation in the OFDM symbol shown in FIG. 1.
Figure 4A:
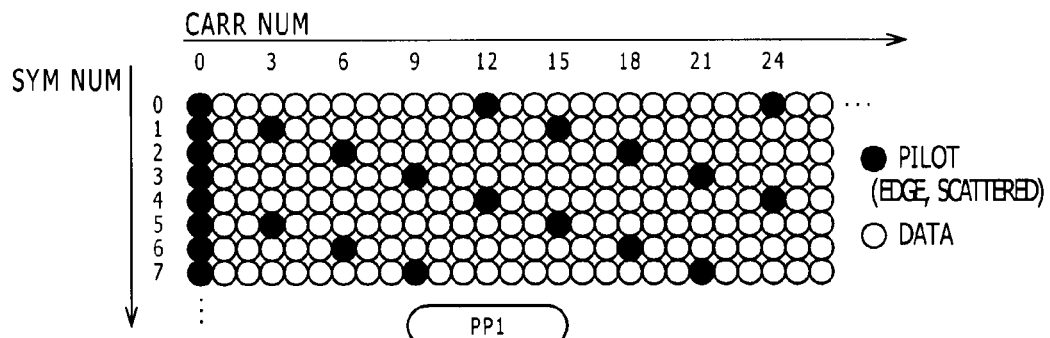
FIGS. 4A to 4H are respectively diagrams showing examples of PPs in the DVB-T2.
Figure 4B:
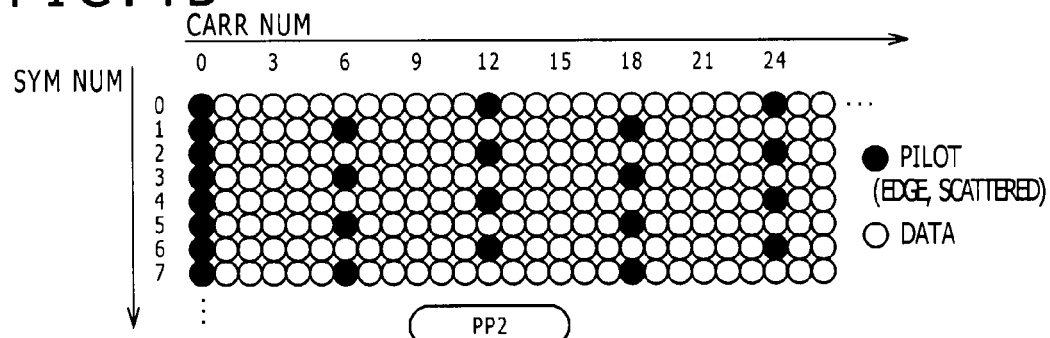
Figure 4C:
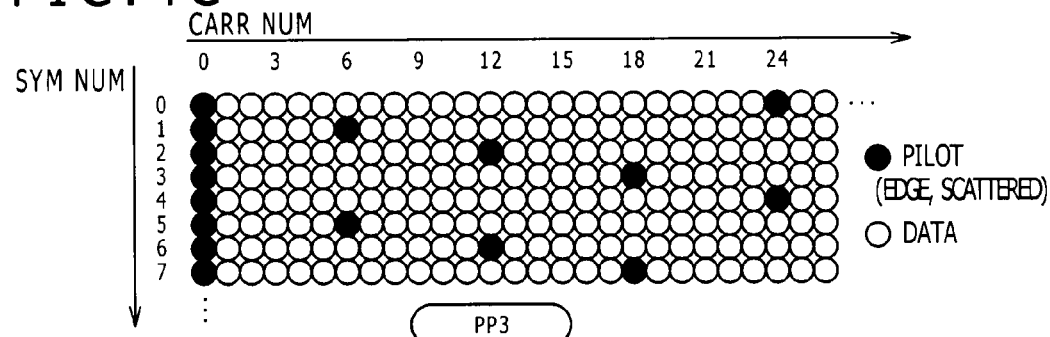
Figure 4D:
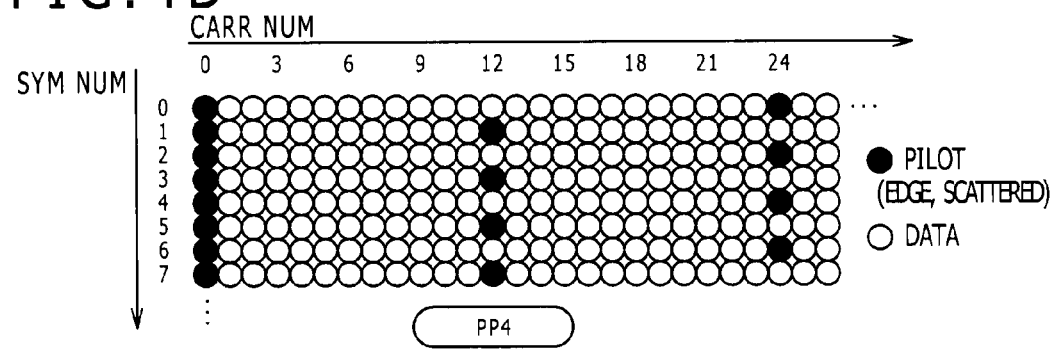
Figure 4E:
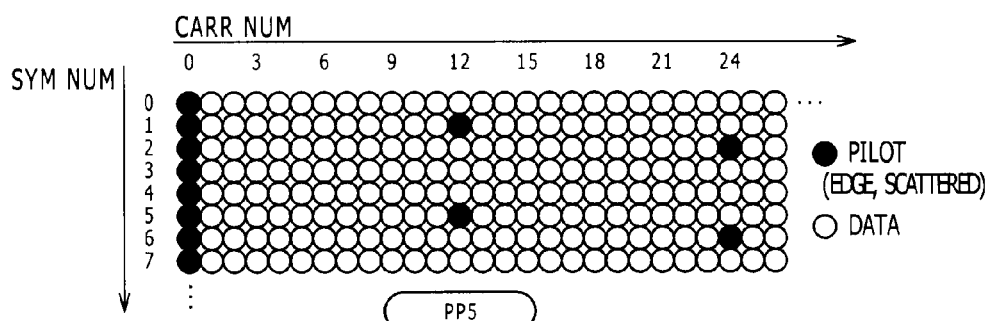
Figure 4F:
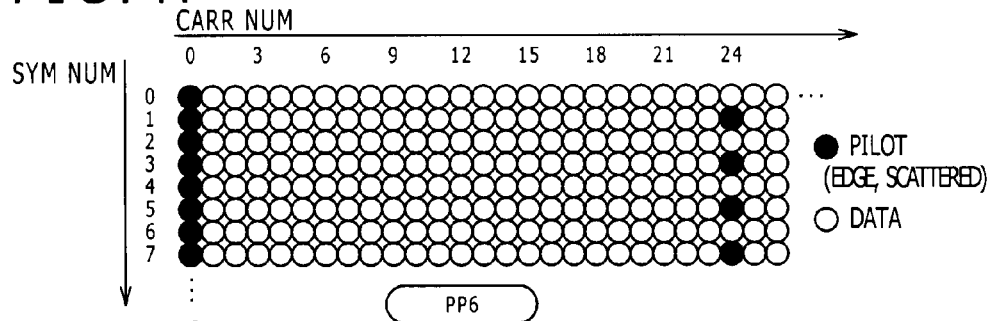
Figure 4G:
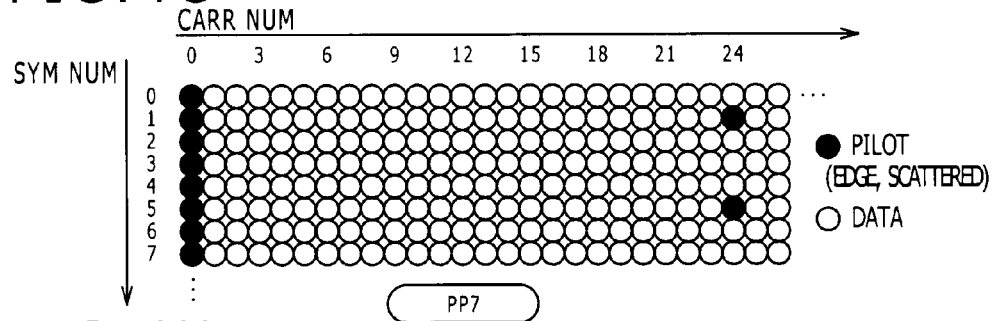
Figure 4H:
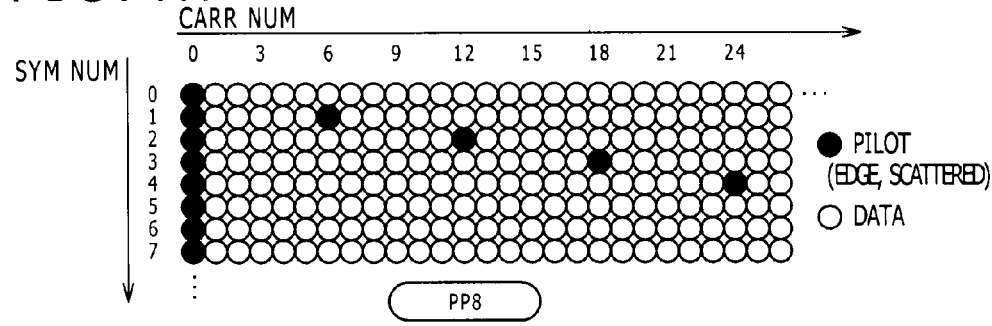
Figure 5:
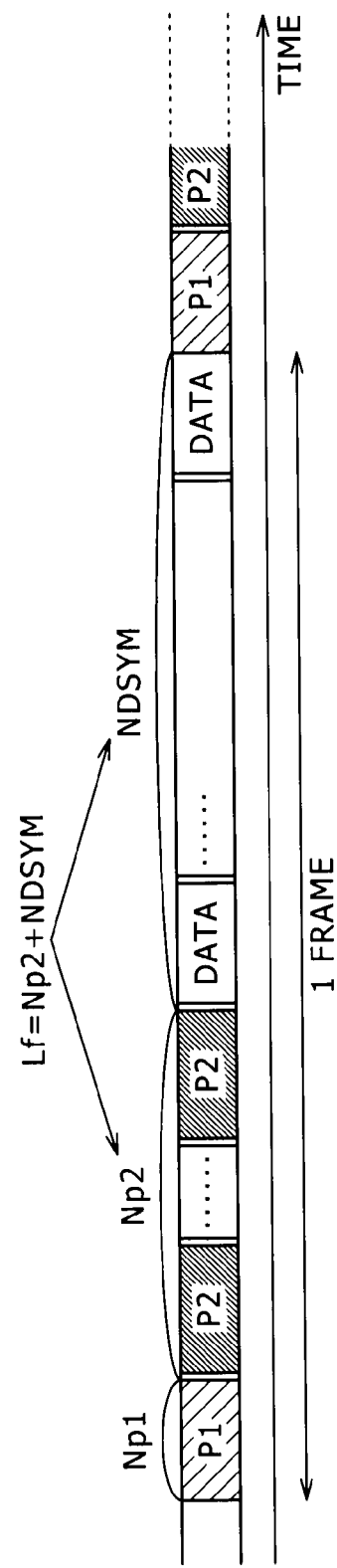
FIG. 5 is a diagram showing a format of a T2 frame.

In the case of FIG. 13, since Dx=6, Dy=16, and Dx×Dy=96, the decision is made as shown in PP8 of FIG. 4H. However, since Np2=1 and NDSYM=3, only the symbols having the symbols 0 to 3 exist. Therefore, the SPs in the data are respectively arranged in the carrier numbers 0 to 18, and 96 to 114 which are all deeply hatched, but the SPs in the data are not respectively arranged in the carrier numbers 24 to 90 in the section indicated by A and lightly hatched.

In such a case, short frame=1 is inputted from the Lf calculating portion 22 to the time interpolating portion 15. Therefore, the time interpolating portion 15 carries out the time interpolation by utilizing the pilot (P2P) which has the P2 symbol and is arranged in the symbol number 0, and which is located in the carrier position of the interpolation SP every frame instead of using any of the SPs not arranged.

It is noted that the time interpolation may be carried out only for the section, in the short frame, indicated by A by using the pilot having the P2 symbol. In addition, in the case of the short frame, the time interpolation may be carried out for the entire short frame (in addition to the section indicated by A) by using the pilot having the P2 symbol.

As a result, in the case of the short frame, in particular, the time interpolation can be carried out not only for the section deeply hatched, but also for the section indicated by A and lightly hatched. As a result, even in the case of the short frame, it is possible to precisely estimate the transmission path.

[Processing in Receiving Apparatus]

Next, decoding processing executed in the receiving apparatus 1 will be described with reference to a flow chart shown in FIG. 14.

The time domain IF signal of the OFDM signal transmitted from the transmitting apparatus is inputted to the orthogonal demodulating portion 11. In step S11, the orthogonal demodulating portion 11 executes the orthogonal demodulating processing for the OFDM signal inputted thereto, and outputs the resulting OFDM time domain BB signal to the FFT arithmetically operating portion 12.

In step S12, the FFT arithmetically operating portion 12 extracts (a sampled value of) the OFDM time domain BB signal for the FFT size from the OFDM time domain BB signal inputted thereto, carries out the FFT arithmetic operation, and outputs the resulting OFDM frequency region BB signal to each of the pilot extracting portion 13, and the dividing portion 17.

In step S13, the pilot extracting portion 13 extracts the pilots such as the pilot having the P1 symbol as the known signal, the pilot having the P2 symbol, the Edge pilot, and the Scattered Pilot (SP) from the OFDM frequency region BB signal inputted thereto, and supplies the pilot signals thus extracted to the time interpolating portion 15.

In step S14, the time interpolating portion 15 determines whether or not the frame being processed is the short frame by using the information on the pilot pattern (PP), the NDSYM, and the FFT size which are supplied from the L1 interpreting portion 18.

Specifically, the Dy determining portion 21 selects a value of Dy corresponding to the pilot pattern (PP) inputted thereto from the L1 interpreting portion 18 (that is, the symbol interval of the SPs in the same carrier), and outputs the value of Dy thus selected to the comparison determining portion 23. The portion 31 for determining the number of P2 symbols selects the number of P2 symbols corresponding to the value of FFTSIZE inputted thereto from the L1 interpreting portion 18, and outputs the value of FFTSIZE to the comparison determining portion 23.

The adding portion 32 adds the information on the NDSYM from the L1 interpreting portion 18, and the information on the number of P2 symbols from the portion 31 for determining the number of P2 symbols to each other, and outputs the number (Lf) of symbols, in one frame except for P1, as a value of the result of the addition to the comparison determining portion 23.

The comparison determining portion 23 determines whether or not the current frame being processed is the short frame by comparing a value of Dy corresponding to the pilot pattern from the Dy determining portion 21, and a value of the number (Lf) of symbols, in one frame except for P1, from the adding portion 32.

When it is determined in step S14 that Lf is smaller than Dy, that is, the current frame being processed is the short frame, the comparison determining portion 23 outputs short frame=1 to the time interpolating portion 15, and the operation proceeds to processing in step S15.

In step S15, after short frame=1 is inputted to the time interpolating portion 15, the time interpolating portion 15 carries out the time interpolation for short frame=1 by using the pilot (P2P) having the P2 symbol, and outputs a signal after completion of the time interpolation to the frequency interpolating portion 16.

On the other hand, when it is determined in step S14 that Lf is not smaller than Dy, that is, the current frame being processed is not the short frame, the comparison determining portion 23 outputs short frame=0 (that is, a value representing that the current frame being processed is the normal frame) to the time interpolating portion 15, and the operation proceeds to processing in step S16.

When in step S16, short frame=0 is inputted to the time interpolating portion 15, the time interpolating portion 15 carries out the time interpolation for short frame=0 frame by using the Scattered Pilot (SP), and outputs a signal after completion of the time interpolation to the frequency interpolating portion 16.

In step S17, the frequency interpolating portion 16 shifts (rotates) the position of the frequency interpolation filter so as to correspond to the optimal central position, subjects a signal after completion of the time interpolation to the frequency interpolation filter, and outputs a signal after completion of the frequency interpolation to the dividing portion 17.

In step S18, the dividing portion 17 divides the OFDM frequency region BB signal after completion of the FFT arithmetic operation from the FFT arithmetically operating portion 12 by a signal after completion of the frequency interpolation from the frequency interpolating portion 16, thereby equalizing the signal transmitted thereto from the transmitting apparatus. The dividing portion 17 supplies the signal thus equalized to the L1 interpolating portion 18.

In step S19, the L1 interpreting portion 18 acquires a signal corresponding to the OFDM symbol of P2, and interprets (decodes) each of the L1 presignaling and the L1 postsignaling. The L1 interpreting portion 18 acquires information on the L1 presignaling and the L1 postsignaling thus interpreted. The L1 interpreting portion 18 outputs the information on the PP, the NDSYM, and the FFTSIZE of the information on the L1 presignaling thus acquired to the short frame determining portion 14, and outputs the signal equalized by the dividing portion 17 to the error correcting portion (not shown) or the like in the subsequent stage of the L1 interpreting portion 18.

As described above, since in the case of the short frame, the time interpolation is carried out by using (the pilot of) the P2 symbol, even in the case of the short frame, the time interpolation can be carried out. As a result, even in the case of the short frame, it is possible to precisely carry out the transmission path estimation.

It is noted that although the above description has been given with respect to the case of the SISO in the DVB-T2, in the DVB-T2, similarly to the case of the DVB-T or the ISDB-T, in addition to the SISO system, the MISO system is also approved. Here, the MISO system means a system in which signals from a plurality of transmitting apparatuses are received at one antenna.

[Examples of PPs in Case of MISO System]

FIGS. 15A to 15H show examples of arrangement of the SPs in the pilot patterns PP1 to PP8 in the case of the MISO system. In the examples shown in FIGS. 15A to 15H, respectively, similarly to the cases shown in FIGS. 4A to 4H, an open circle mark represents the data becoming an object of the transmission. Unlike the examples shown in FIGS. 4A to 4H, respectively, a black circle mark with an outline N-character on a black ground represents a Normal SP, and a block circle symbol with an outline I-character on a black ground represents an Inverted SP.

That is to say, in the case of the MISO system as well, the same PP (the arrangement of the SPs) as that in FIG. 3 is obtained. However, in the case of the MISO system, both the Normal SP and the Inverted SP are contained as the SPs in each of the signals sent from a plurality of transmitting apparatuses. The Normal SPs are the SPs which are in phase with one another among a plurality of transmitting apparatuses, and the Inverted SPs are the SPs which are different in phase from one another among a plurality of transmitting apparatuses, that is, the SPs which are in opposite phase with one another among a plurality of transmitting apparatuses.

Figure 15A:
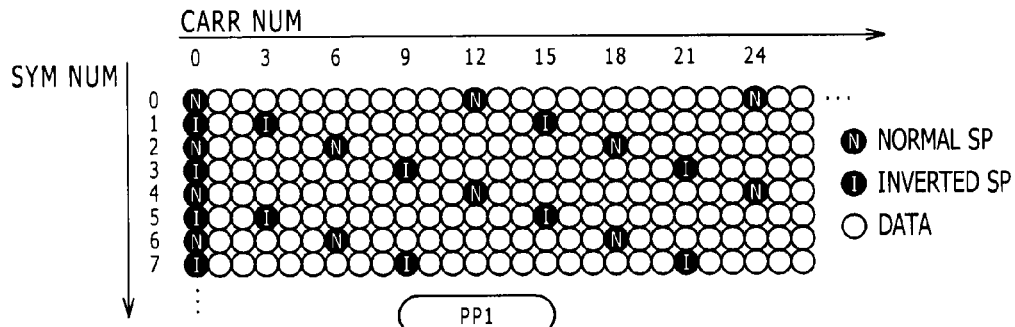
FIGS. 15A to 15H are respectively diagrams showing examples of PPs in the case of the MISO system in the DVB-T2.

In the case of PP1 shown in FIG. 15A, as described with reference to FIG. 3, Dx=3, Dy=4, and Dx×Dy=12. When the carrier number 0 is excluded because the Normal SPs and the Inverted SPs are alternately arranged as the Edge pilots in the carrier number 0, the Normal SPs are respectively arranged in the symbols having the symbol numbers 0, 4, . . . in the carrier numbers 12, 24, . . . , and in the symbols having the symbol numbers 2, 6, . . . in the carrier numbers 6, 18, . . . . The Inverted SPs are respectively arranged in the symbols having the symbol numbers 1, 5, 9, . . . in the carrier numbers 3, 15, . . . , and in the symbols having the symbol numbers 3, 7, . . . in the carrier numbers 9, 21, . . . .

Figure 15B:
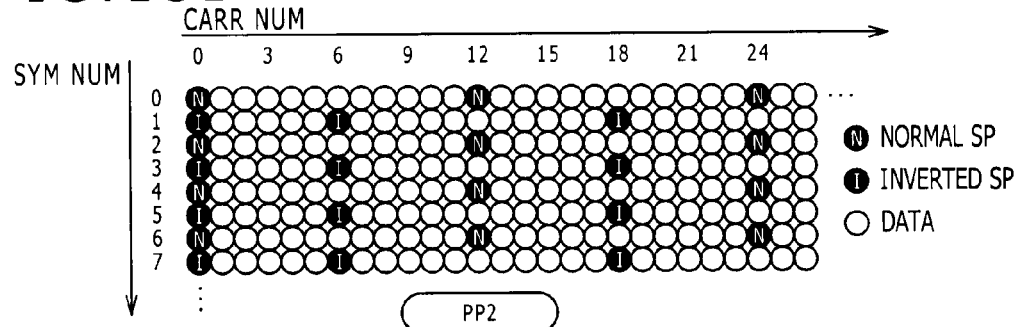

In the case of PP2 shown in FIG. 15B, as described with reference to FIG. 3, Dx=6, Dy=2, and Dx×Dy=12. When the carrier number 0 is excluded because the Normal SPs and the Inverted SPs are alternately arranged as the Edge pilots in the carrier number 0, the Normal SPs are respectively arranged in each of the symbols having the symbol numbers 0, 2, 4, 6, . . . in the carrier numbers 12, 24, . . . . The Inverted SPs are respectively arranged in the symbols having the symbol numbers 1, 3, 5, 7, . . . in the carrier numbers 6, 8, . . . .

Figure 15C:
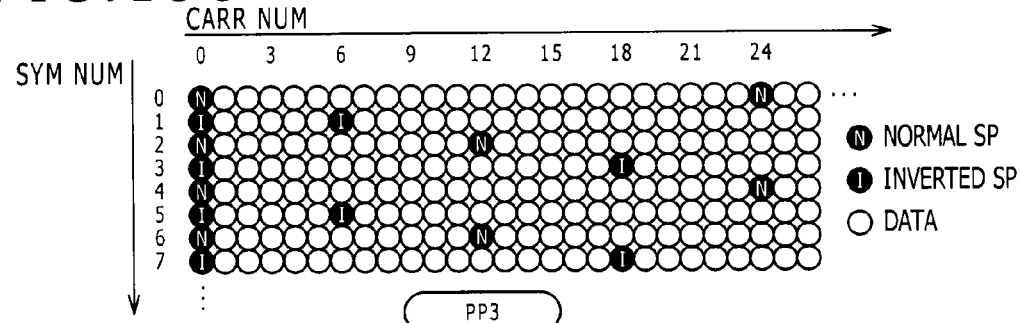

In the case of PP3 shown in FIG. 15C, as described with reference to FIG. 3, Dx=6, Dy=4, and Dx×Dy=24. When the carrier number 0 is excluded because the Normal SPs and the Inverted SPs are alternately arranged as the Edge pilots in the carrier number 0, the Normal SPs are respectively arranged in the symbols having the symbol numbers 0, 4, . . . in the carrier numbers 24, 48, . . . , and in the symbols having the symbol numbers 2, 6 . . . in the carrier numbers 12, 36, . . . . The Inverted SPs are respectively arranged in the symbols having the symbol numbers 1, 5, . . . in the carrier numbers 6, 30, . . . , and in the symbols having the symbol numbers 3, 7, . . . in the carrier numbers 18, 42, . . . .

Figure 15D:
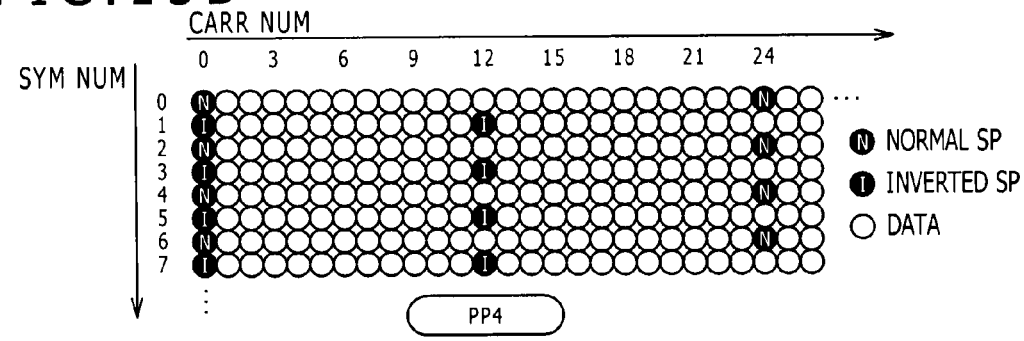

In the case of PP4 shown in FIG. 15D, as described with reference to FIG. 3, Dx=12, Dy=2, and Dx×Dy=24. When the carrier number 0 is excluded because the Normal SPs and the Inverted SPs are alternately arranged as the Edge pilots in the carrier number 0, the Normal SPs are respectively arranged in the symbols having the symbol numbers 0, 2, 4, 6, . . . in the carrier numbers 24, 48, . . . . The Inverted SPs are respectively arranged in the symbols having the symbol numbers 1, 3, 5, 7, . . . in the carrier numbers 12, 36, . . . .

Figure 15E:
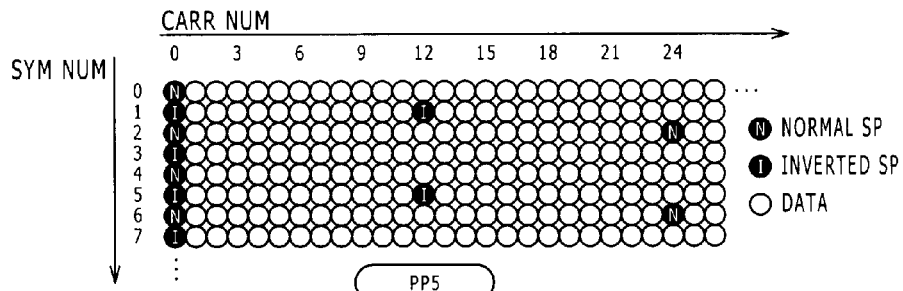

In the case of PP5 shown in FIG. 15E, as described with reference to FIG. 3, Dx=12, Dy=4, and Dx×Dy=48. When the carrier number 0 is excluded because the Normal SPs and the Inverted SPs are alternately arranged as the Edge pilots in the carrier number 0, the Normal SPs are respectively arranged in the symbols having the symbol numbers 0, 4, . . . in the carrier numbers 48, 96, and are respectively arranged in the symbols having the symbol numbers 2, 6, . . . in the carrier numbers 24, 72, . . . . The Inverted SPs are respectively arranged in the symbols having the symbol numbers 1, 5, . . . in the carrier numbers 12, 60, . . . , and in the symbols having the symbol numbers 3, 7, . . . in the carrier numbers 36, 84, . . . .

Figure 15F:
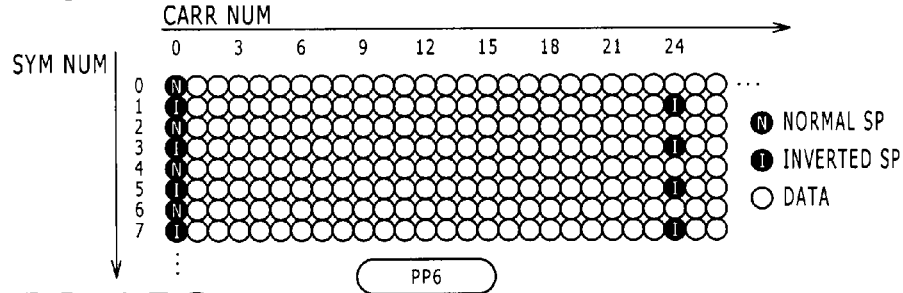

In the case of PP6 shown in FIG. 15F, as described with reference to FIG. 3, Dx=24, Dy=2, and Dx×Dy=48. When the carrier number 0 is excluded because the Normal SPs and the Inverted SPs are alternately arranged as the Edge pilots in the carrier number 0, the Normal SPs are respectively arranged in the symbols having the symbol numbers 0, 2, 4, 6, . . . in the carrier numbers 48, 96, . . . . The Inverted SPs are respectively arranged in the symbols having the symbol numbers 1, 3, 5, 7, . . . in the carrier numbers 24, 72, . . . .

Figure 15G:
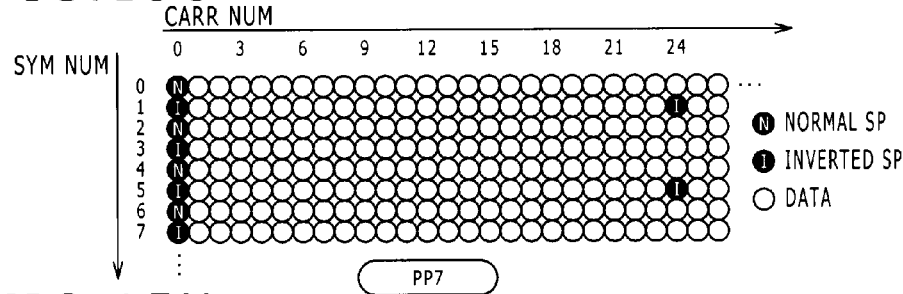

In the case of PP7 shown in FIG. 15G, as described with reference to FIG. 3, Dx=24, Dy=4, and Dx×Dy=96. When the carrier number 0 is excluded because the Normal SPs and the Inverted SPs are alternately arranged as the Edge pilots in the carrier number 0, the Normal SPs are respectively arranged in the symbols having the symbol numbers 0, 4, . . . in the carrier numbers 96, 192, and are respectively arranged in the symbols having the symbol numbers 2, 6, . . . in the carrier numbers 48, 144, . . . . The Inverted SPs are respectively arranged in the symbols having the symbol numbers 1, 5, . . .

in the carrier numbers 24, 120, and in the symbols having the symbol numbers 3, 7, . . . in the carrier numbers 72, 168, . . . .

In the case of PP8 shown in FIG. 15H, as described with reference to FIG. 3, Dx=6, Dy=16, and Dx×Dy=96. When the carrier number 0 is excluded because the Normal SPs and the Inverted SPs are alternately arranged as the Edge pilots in the carrier number 0, the Normal SPs are respectively arranged in the symbols having the symbol numbers 0, 16, . . . in the carrier numbers 96, 192, . . . , in the symbols having the symbol numbers 2, 18, . . . in the carrier numbers 12, 108, . . . , and in the in the symbols having the symbol numbers 4, 20, . . . in the carrier numbers 24, 120, . . . . The Inverted SPs are respectively arranged in the symbols having the symbol numbers 1, 17, . . . in the carrier numbers 6, 102, . . . , and in the symbols having the symbol numbers 3, 19, . . . in the carrier numbers 18, 114, . . . .

Here, in the case of the MISO system, with regard to the pilot of the P2 symbol, the Normal SPs and the Inverted SPs are alternately arranged in each of the carriers. Therefore, as shown in FIG. 16, the Normal SP and the Inverted SP arranged in the P2 symbol, and the Normal SP and the Inverted SP which are arranged in the data symbol are different from each other in spite of the same carrier in some cases.

[Example of Time Interpolation in Case of Short Frame in MISO System]

Figure 15H:
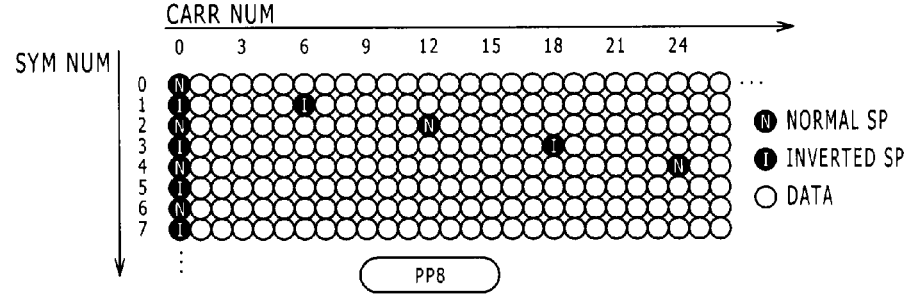
Figure 16:
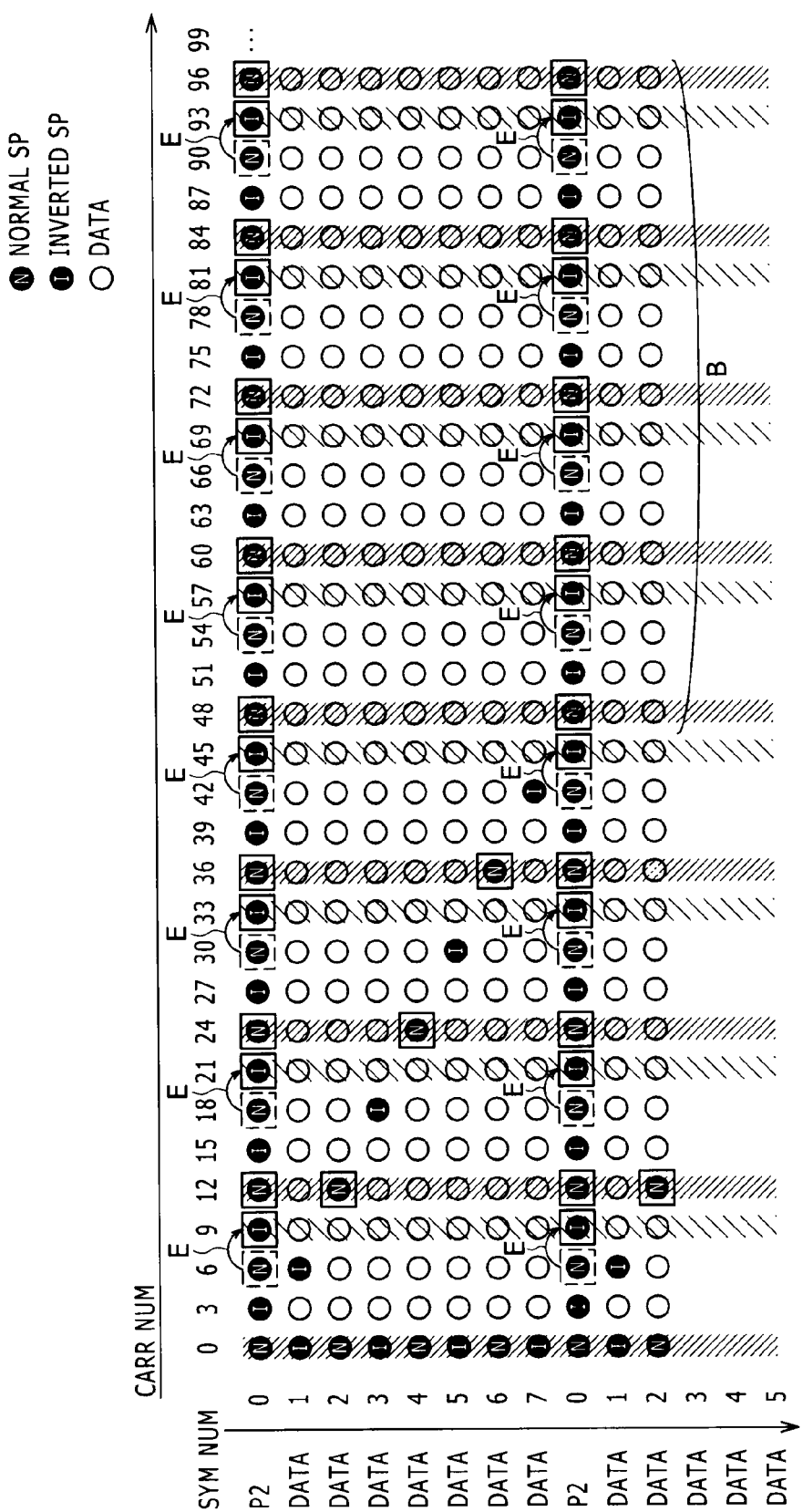
FIG. 16 is a diagram showing an example of the time interpolation, in the case of the short frame in the MISO system, made by the receiving apparatus shown in FIG. 10.

FIG. 16 is a diagram showing an example of the time interpolation in the case of the short frame in the MISO system. It is noted that the case of the short frame in which the FFT size is 32K, PP8 (Dx=6, Dy=16, Np2=1), Normal mode, NDSYM=7 is shown in the example of FIG. 16. In the example of FIG. 16, similarly to the case of FIGS. 15A to 15H, the open circle mark represents the data (carrier) becoming an object of the transmission, the black circle mark with an outline N-character on a black ground represents the Normal SP, and the black circle mark with an outline I-character on a black ground represents the Inverted SP. In addition, in the example of FIG. 16, a portion deeply hatched represents the carrier which is interpolated by using the Normal SP, and a portion lightly hatched represents the carrier which is interpolated by using the Inverted SP.

In the case of this example, since Dx=6, Dy=16, and Dx×Dy=96, the decision is made as shown in PP8 of FIG. 15H. However, since Np2=1 and NDSYM=7, only the symbols having the symbol numbers 0 to 7 exist. Therefore, as shown in FIG. 16, the Normal SPs and the Inverted SPs in the data are arranged in the carriers having the carrier numbers 0 to 45, but are not arranged in the carriers having the carrier numbers 48 to 96.

In addition, when viewing the arrangement of the Normal SPs and the Inverted SPs in the data, it is understood that actually, the carriers having the carrier numbers 0, 12, 24, 36, 48, 60, 72, 84, and 96 are the carriers which are respectively interpolated by using the Normal SPs, and the carriers having the carrier numbers 6, 18, 42, 54, 66, 78, and 90 are the carriers which are respectively interpolated by using the Inverted SPs.

However, the pilots of the P2 symbol in each of the carriers having the carrier numbers 6, 18, 42, 54, 66, 78, and 90 is the Normal SP, and thus is different in frequency from the Inverted SP arranged in the data.

Here, the SP (Normal SP, Inverted SP) in the data is not arranged in the section indicated by B. However, carrying out the time interpolation without change by using the pilot in the P2 symbol instead of using the SP like the case of the SISO system described above with reference to FIG. 13 results in that the interpolation is carried out by using the different frequencies (inverted frequencies). Thus, it may be impossible to properly carry out the transmission estimation.

In order to cope with this situation, in the MISO system, when the SP arranged in the data is the Inverted SP, and the SP arranged in the P2 symbol is the Normal SP, the time interpolating portion 15 carries out the time interpolation by using the Inverted SPs of the carriers each having the adjacent SPs as indicated by an arrow E.

That is to say, although the carrier having the carrier number 6 is desired to be time-interpolated by using the Inverted SP, the pilot in the P2 symbol having the carrier number 6 is the Normal SP. Therefore, the time interpolating portion 15 carries out the time interpolation by using the Inverted SPs in the P2 symbols of the adjacent carrier number 9 having the SPs.

This also applies to the case of each of the carrier numbers 18, 30, 42, 54, 66, 78, and 90. Thus, the time interpolating portion 15 carries out the time interpolation by using the Inverted SPs in the P2 symbols of the carrier numbers 21, 33, 45, 57, 69, 81, and 93 adjacent to the carrier numbers 18, 30, 42, 54, 66, 78, and 90, respectively, each having the SP.

It is noted that information on whether the system is the MISO system or the SISO system is contained in the L1 presignaling of the P2 symbol. Therefore, the time interpolating portion 15 can acquire the information described above from the L1 interpreting portion 18 and can carry out the time interpolation by using the SPs of the P2 symbols of the adjacent carriers each having the SP when each of the pilots of the P2 symbols in the same carrier, and each of the Scattered Pilots (SPs) in the data are inverted in phase to each other.

As a result, the time interpolation can be carried out even in the case of the short frame in the MISO system, and the short frame is interpolated in the frequency direction, thereby making it possible to properly carry out the transmission estimation.

[Configuration of Recording System]

First Embodiment

Figure 17:
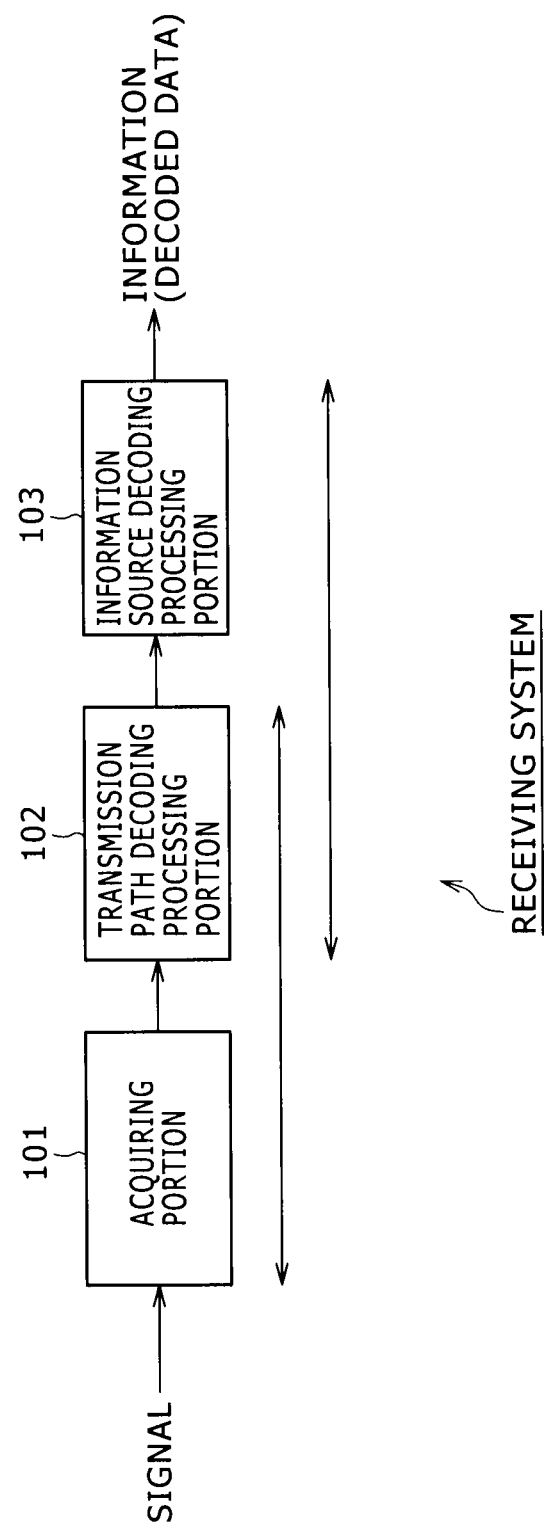
FIG. 17 is a block diagram showing a configuration of a first embodiment of a receiving system to which the embodiment of the present invention shown in FIG. 10 is applied.

FIG. 17 is a block diagram showing a configuration of a first embodiment of a receiving system to which the embodiment of the receiving apparatus of the present invention shown in FIG. 10 is applied.

The receiving system shown in FIG. 17 is composed of an acquiring portion 101, a transmission path decoding processing portion 102, and an information source decoding processing portion 103.

The acquiring portion 101 acquires a signal through a transmission path such as a terrestrial digital broadcasting, a satellite digital broadcasting, a CATV network, the Internet or any other suitable network not shown, and supplies the signal thus acquired to the transmission path decoding processing portion 102.

The transmission path decoding processing portion 102 subjects the signal acquired through the transmission path by the acquiring portion 101 to transmission path decoding processing containing therein error correction, and supplies the resulting signal to the information source decoding processing portion 103. The recording apparatus 1 shown in FIG. 10 is included in the transmission path decoding processing portion 102.

The information source decoding processing portion 103 subjects the signal which has been subjected to the transmission path decoding processing to information source decoding processing containing therein processing for expanding compressed information to original information to acquire data as an object of the transmission.

That is to say, the signal acquired through the transmission path by the acquiring portion 101 is subjected to compression encoding for compressing information in order to reduce an amount of data on an image, a sound or the like in some cases. In such cases, the information source decoding processing portion 103 subjects the signal which has been subjected to the transmission path decoding processing to information source decoding processing such as processing for expanding the compressed information to the original information.

It is noted that when the signal acquired through the transmission path by the acquiring portion 101 is not subjected to the compression encoding, the processing for expanding the compressed information to the original information is not executed in the information source decoding processing portion 103. Here, MPEG decoding or the like, for example, is given as the expanding processing. In addition, in addition to the expanding processing, descramble or the like is contained in the information source decoding processing in some cases.

The receiving system shown in FIG. 17, for example, can be applied to a television tuner or the like for receiving the digital television broadcasting. It is noted that the acquiring portion 101, the transmission path decoding processing portion 102, and the information source decoding processing portion 103 can be configured in the form of respective independent units (either hardware (such as Integrated Circuits (ICs) or software modules).

In addition, the three sets, that is, the acquiring portion 101, the transmission path decoding processing portion 102, and the information source decoding processing portion 103 can be configured in the form of one independent unit. Also, a set of acquiring portion 101 and transmission path decoding processing portion 102 can be configured in the form of one independent unit, and a set of transmission path decoding processing portion 102 and information source decoding processing portion 103 can also be configured in the form of one independent unit.

Second Embodiment

Figure 18:
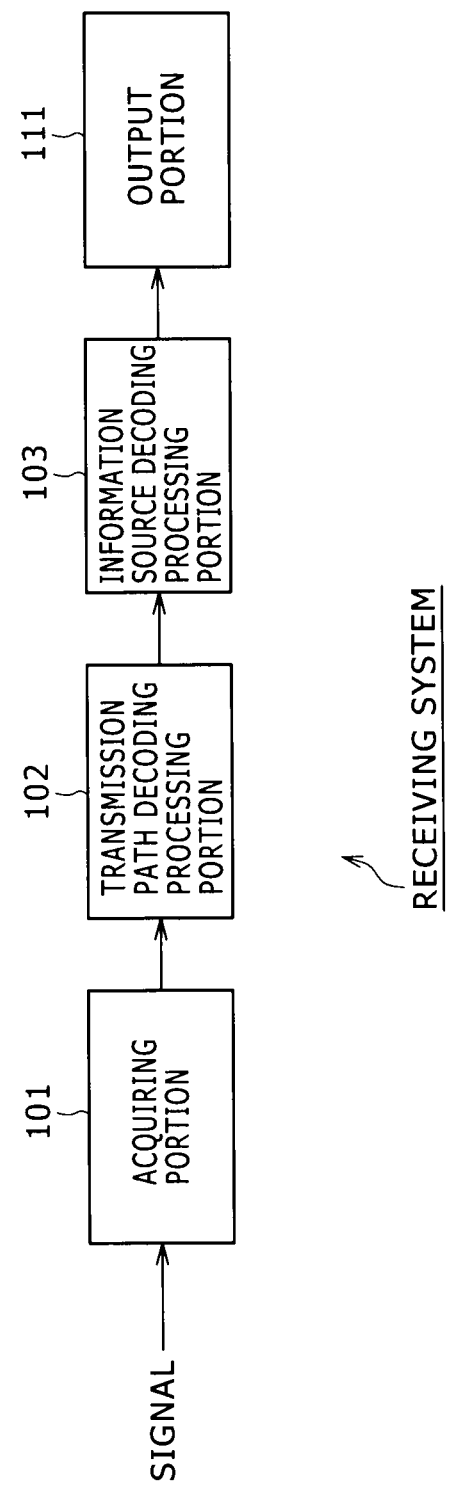
FIG. 18 is a block diagram showing a configuration of a second embodiment of a receiving system to which the embodiment of the present invention shown in FIG. 10 is applied.

FIG. 18 is a block diagram showing a configuration of a second embodiment of the receiving system to which the embodiment of the receiving apparatus of the present invention shown in FIG. 10 is applied.

In the configuration of the receiving system shown in FIG. 18, portions corresponding to those in the configuration of the receiving system shown in FIG. 17 are designated by the same reference numerals, respectively, and a detailed description thereof is omitted here for the sake of simplicity.

The configuration of the receiving system shown in FIG. 18 is same with that of the receiving system shown in FIG. 17 in that the receiving system shown in FIG. 18 has the acquiring portion 101, the transmission path decoding processing portion 102, and the information source decoding processing portion 103, but is different from that of the receiving system shown in FIG. 17 in that an output portion 111 is newly provided.

The output portion 111, for example, is composed of a display device for displaying thereon an image, or a speaker for outputting therefrom a sound, and outputs an image, a sound or the like based on the signal outputted from the information source decoding processing portion 103. That is to say, the output portion 111 either displays thereon an image, or outputs therefrom a sound.

The receiving system shown in FIG. 18, for example, can be applied to a TV for receiving a television broadcasting as a digital broadcasting, a radio receiver for receiving a radio broadcasting, or the like.

It is noted that when the signal acquired in the acquiring portion 101 is not subjected to the compression encoding, the signal outputted from the transmission decoding processing portion 102 is directly supplied to the output portion 111.

Third Embodiment

FIG. 19 is a block diagram showing a configuration of a third embodiment of the receiving system of the present invention.

In the configuration of the receiving system shown in FIG. 19, portion corresponding to those in the configuration of the receiving system shown in FIG. 17 are designated by the same reference numerals, respectively, and a detailed description thereof is omitted here for the sake of simplicity.

The configuration of the receiving system shown in FIG. 19 is same with that of the receiving system shown in FIG. 18 in that the receiving system shown in FIG. 19 has the acquiring portion 101, and the transmission path decoding processing portion 102, but is different from that of the receiving system shown in FIG. 17 in that the information source decoding processing portion 103 is not provided, and a recording portion 121 is newly provided.

The recording portion 121 records (causes a recording (memory) medium to record) the output signal (for example, a TS packet of a TS of an MPEG) outputted from the transmission path decoding processing portion 102 in a recording (memory) medium such as an optical disk, a hard disk (magnetic disk), or a flash memory.

The receiving system shown in FIG. 19 as described above can be applied to a recorder apparatus or the like for recording therein a television broadcasting.

The signal which has been subjected to the information source decoding processing in the information source decoding processing portion 103 provided in the receiving system shown in FIG. 19, that is, the image or sound obtained through decode may be recorded in the recording portion 121.

Fourth Embodiment

A fourth embodiment of the recording system for receiving the signal having the frame having one frame length of a plurality of patterns includes the transmission path decoding processing portion 102 for subjecting the signal acquired through the transmission path to the transmission path decoding processing containing therein at least the decoding processing, and the information source decoding processing portion 103 for subjecting the signal which is subjected to at least the transmission path decoding processing to the processing for expanding the compressed information to the original information. In this case, the transmission path decoding processing portion 102 includes the acquiring portion 101, the short frame determining portion 14, and the time interpolating portion 15. Here, the acquiring portion 101 acquires the information on the preamble signal from the OFDM signal transmitted from the transmitting apparatus in accordance with the OFDM system. The short frame determining portion 14 determines whether or not the frame being processed is the short frame based on the information on the preamble signal acquired from the acquiring portion 101. Also, the time interpolating portion 15 obtains the transmission path characteristics by comparing the pilot contained in the preamble signal and the known pilot corresponding to the pilot in the phase of transmission with each other when the frame determining portion 14 determines that the frame being processed is the short frame, and interpolates the data portion in the time direction based on the transmission path characteristics thus obtained.

Although the description has been given so far with respect to the case where the present invention is applied to the receiving apparatus for receiving the OFDM signal transmitted in accordance with the DVB-T.2, the present invention, for example, can also be applied to any other suitable apparatus for receiving a signal which can become the short frame.

The series of processing described above either can be executed by the hardware or can be executed by the software. When the series of processing described above is executed by the software, a program composing the software concerned is installed in a computer. Here, a computer incorporated in the dedicated hardware, or a general-purpose personal computer which can execute various kinds of functions by installing therein various kinds of programs, or the like is included in the computer described above.

[Program]

FIG. 20 is a block diagram showing a configuration of hardware of a computer for executing the series of processing described above by using a program.

In the computer, a Central Processing Unit (CPU) 201, a Read Only Memory (ROM) 202, a Random Access Memory (RAM) 203 are connected to one another through a bus 204. An I/O interface 205 is further connected to the bus 204. An input portion 206, an output portion 207, a memory portion 208, a communication portion 209, and a drive 210 are connected to the I/O interface 205.

The input portion 206 is composed of a keyboard, a mouse, a microphone or the like. The output portion 207 is composed of a display device, a speaker or the like. The memory portion 208 is composed of a hard disk, a nonvolatile memory or the like. The communication portion 209 is composed of a network interface or the like. Also, the drive 210 drives a removable media 211 such as a magnetic disk, an optical disk, a magnet-optical disk, or a semiconductor memory.

In the computer configured in the manner described above, the CPU 201, for example, loads a program stored in the memory portion 208 through the I/O interface 205 and the bus 204 in the RAM 203, and executes the program thus loaded, thereby executing the series of processing described above.

The program executed by the computer (the CPU 201), for example, can be recorded in the removable media 211 as the package media or the like to be provided. In addition, the program can be provided through a wired or wireless transmission media such as a local area network (LAN), the Internet or a digital broadcasting.

In the computer, the removable media 211 is mounted to the drive 210, whereby the program can be installed in the memory portion 208 through the I/O interface 205. In addition, the program can be received by the communication portion 209 through the wired or wireless transmission media, and thus can be installed in the memory portion 208. In addition, the program can be previously installed either in the ROM 202 or in the memory portion 208.

It is noted that the program executed by the computer either may be a program in accordance with which the processing is executed in a time series manner along the order described above in this specification, or may be a program in accordance with which the processing is executed in parallel or at a necessary timing such as when calling is made.

Figure 14:
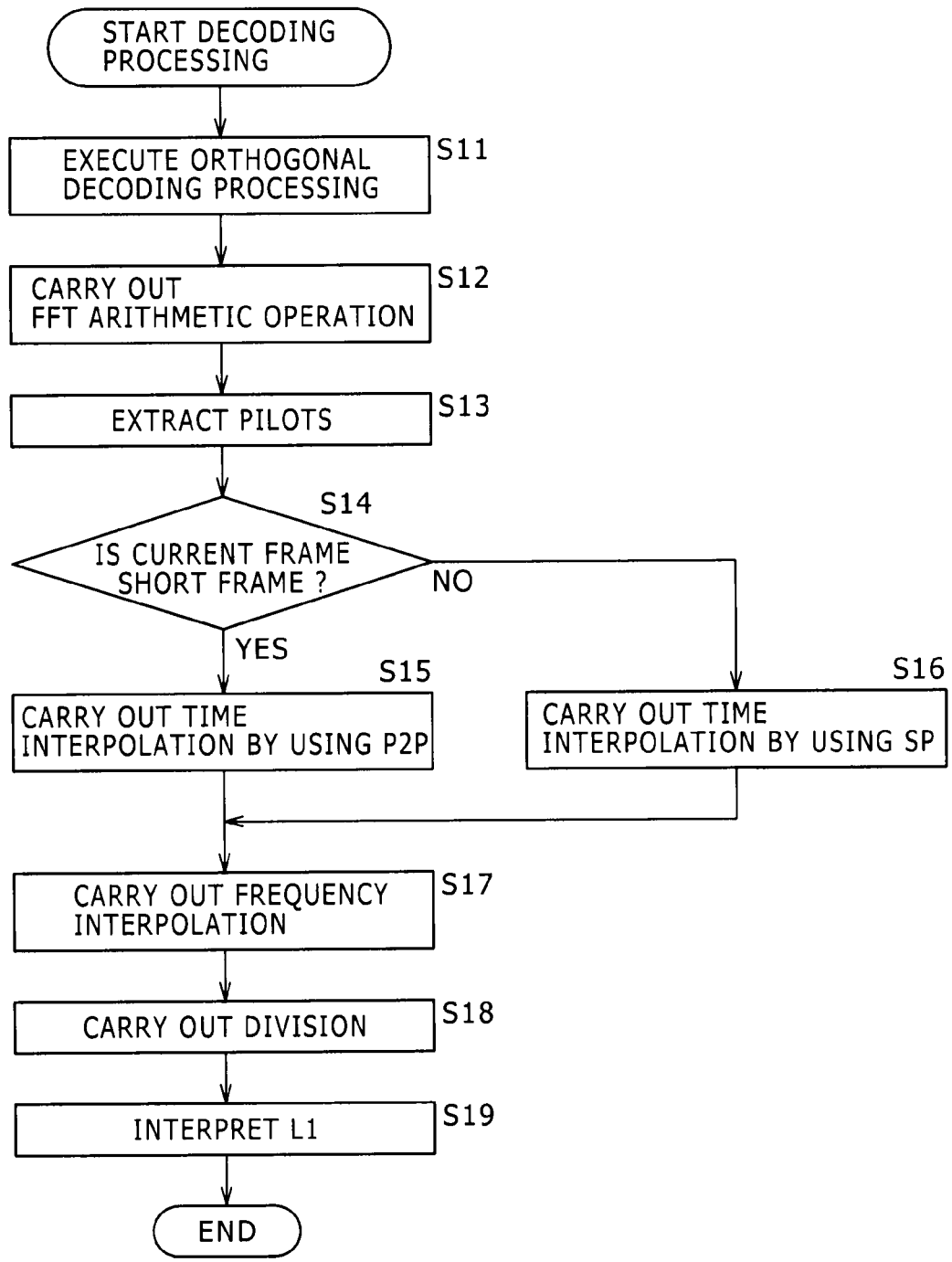
FIG. 14 is a flow chart explaining receiving processing executed in the receiving apparatus shown in FIG. 10.

It is noted that the receiving method of the present invention is embodied in accordance with the flow chart, shown in FIG. 14, in accordance with which the decoding processing of the embodiment of the receiving apparatus shown in FIG. 10 is executed.

The embodiments of the present invention are by no means limited to the embodiments described above, and various kinds of changes can be made without departing from the subject matter of the present invention.

The present application contains subject matter related to that disclosed in Japanese Priority Patent Application JP 2009-283759 filed with the Japan Patent Office on Dec. 15, 2009, the entire content of which is hereby incorporated by reference.

What is claimed is:

1. A receiving apparatus for receiving an orthogonal frequency division multiplexing (OFDM) signal, each frame of the OFDM signal having a frame length and a plurality of patterns, the apparatus comprising:
a processor including:
an acquiring unit that acquires information regarding a preamble signal from the OFDM signal, which is transmitted from a transmitting apparatus in accordance with an OFDM system;
a frame determining unit that determines whether or not the frame length of the OFDM signal is short frame based on the information regarding the preamble signal acquired from said acquiring unit; and
a time interpolating unit that obtains transmission path characteristics by comparing a pilot in the preamble signal with a previously determined pilot corresponding to said pilot in the preamble signal, when said frame determining unit determines that the frame length is short frame, and that interpolates a data portion in a time direction based on the obtained transmission path characteristics,
wherein the short frame is a frame in which a number of symbols in the frame, except for preamble signals existing before said preamble signal in terms of time, is less than an interval of symbols in a same carrier of a discrete pilot arranged in the data portion.

2. The receiving apparatus according to claim 1,
wherein, when the frame determining unit determines that the frame length is not short frame, said time interpolating unit obtains the transmission path characteristics by comparing the discrete pilot with the previously determined pilot corresponding to said discrete pilot, and interpolates the data portion in the time direction in accordance with the obtained transmission path characteristics.

3. The receiving apparatus according to claim 2,
wherein, when the OFDM signal is MISO-transmitted from the transmitting apparatus, and the preamble signal and the discrete pilot in the same carrier are opposite in phase with each other, said time interpolating unit obtains the transmission path characteristics by comparing the pilot in the preamble signal in phase with each discrete pilot located adjacent to one another at intervals of a predetermined numbers of carriers, and the previously determined pilot corresponds to the pilot in the phase of the transmission with each other, and interpolates the data portion in the time direction in accordance with the obtained transmission path characteristics.

4. The receiving apparatus according to claim 1,
wherein the information regarding the preamble signal is information regarding a pilot pattern, an FFT size, and a number of OFDM symbols other than the preamble signal in one T2 frame.

5. The receiving apparatus according to claim 1,
wherein the OFDM signal is a signal in compliance with a DVB-T2 standard.

6. A receiving method in a receiving apparatus for receiving an orthogonal frequency division multiplexing (OFDM) signal each frame of the OFDM signal having a frame length and a plurality of patterns, said receiving method, carried out by said receiving apparatus, comprising:

acquiring information regarding a preamble signal from the OFDM signal, which is transmitted from a transmitter in accordance with an OFDM system;

determining whether or not the frame length of the OFDM signal is short frame based on the acquired information regarding the preamble signal; and obtaining transmission path characteristics by comparing a pilot in the preamble signal with a previously determined pilot corresponding to said pilot in the preamble signal, when it is determined that the frame length is short frame, and interpolating a data portion in a time direction based on the obtained transmission path characteristics, wherein the short frame is a frame in which a number of symbols in the frame, except for preamble signals existing before said preamble signal in terms of time, is less than an interval of symbols in a same carrier of a discrete pilot arranged in the data portion.

7. A non-transitory computer-readable storage medium storing computer-readable instructions that, when executed by a computer, cause the computer to perform a method comprising:

acquiring information regarding a preamble signal from an orthogonal frequency division multiplexing (OFDM) signal, which is transmitted from a transmitting apparatus in accordance with an OFDM system, each frame of the OFDM signal having a frame length and a plurality of patterns;

determining whether or not the frame length of the OFDM signal is short frame based on the acquired information regarding the preamble signal; and obtaining transmission path characteristics by comparing a pilot in the preamble signal with a previously determined pilot corresponding to said pilot in the preamble, when said frame determining determines that the frame length is short frame, and interpolating a data portion in a time direction based on the obtained transmission path characteristics, wherein the short frame is a frame in which a number of symbols in the frame, except for preamble signals existing before said preamble signal in terms of time, is less than an interval of symbols in a same carrier of a discrete pilot arranged in the data portion.

8. A receiving system for receiving an orthogonal frequency division multiplexing (OFDM) signal, each frame of the OFDM signal having a frame length and a plurality of patterns, the system comprising:

a processor including;

a first acquiring unit to acquire the OFDM signal through a transmission path; and a transmission path decoding processing portion configured to subject the OFDM signal acquired through said transmission path to transmission path decoding processing including at least decoding processing, wherein said transmission path decoding processing portion includes:

a second acquiring unit to acquire information regarding a preamble signal from the OFDM signal, which is transmitted from a transmitting apparatus in accordance with an OFDM system;

a frame determining unit to determine whether or not a frame length of the OFDM signal is short frame based on the information regarding the preamble signal acquired from said second acquiring unit; and a time interpolating unit to obtain transmission path characteristics by comparing a pilot in the preamble signal with a previously determined pilot corresponding to said pilot in the preamble signal, when said frame determining unit determines that the frame length is short frame, and to interpolate a data portion in a time direction based on the obtained transmission path characteristics, wherein the short frame is a frame in which a number of symbols in the frame, except for preamble signals existing before said preamble signal in terms of time, is less than an interval of symbols in a same carrier of a discrete pilot arranged in the data portion.

9. A receiving system for receiving an orthogonal frequency division multiplexing (OFDM) signal, each frame of the OFDM signal having a frame length and a plurality of patterns, the system comprising: a processor including:

a transmission path decoding processing portion configured to subject the OFDM signal, which is acquired through a transmission path, to transmission path decoding processing including at least decoding processing; and an information source decoding processing portion configured to subject the OFDM signal which is subjected to at least transmission path decoding processing to expand compressed information to original information, wherein said transmission path decoding processing portion includes:

an acquiring unit to acquire information regarding a preamble signal from the OFDM signal, which is transmitted from a transmitting apparatus in accordance with an OFDM system;

a frame determining unit to determine whether or not the frame length of the OFDM signal is short frame based on the information regarding the preamble signal acquired from said acquiring unit; and a time interpolating unit to obtain transmission path characteristics by comparing a pilot in the preamble signal with a previously determined pilot corresponding to said pilot in the preamble signal, when said frame determining unit determines that the frame length is short frame, and to interpolate a data portion in a time direction based on the obtained transmission path characteristics, wherein the short frame is a frame in which a number of symbols in the frame, except for preamble signals existing before said preamble signal in terms of time, is less than an interval of symbols in a same carrier of a discrete pilot arranged in the data portion.

10. A receiving system for receiving an orthogonal frequency division multiplexing (OFDM) signal, each frame of the OFDM signal having a frame length and a plurality of patterns, the system comprising: a processor including:

a transmission path decoding processing portion configured to subject the OFDM signal, which is acquired through a transmission path to transmission path decoding processing including at least decoding processing; and an output portion configured to output at least one of an image and a sound in accordance with the OFDM signal subjected to the transmission path decoding processing;

wherein said transmission path decoding processing portion includes:

an acquiring unit to acquire information regarding a preamble signal from the OFDM signal, which is transmitted from a transmitting apparatus in accordance with an OFDM system;

a frame determining unit to determine whether or not the frame length of the OFDM signal is short frame based on the information regarding the preamble signal acquired from said acquiring unit; and a time interpolating unit to obtain transmission path characteristics by comparing a pilot in the preamble signal with a previously determined pilot corresponding to said pilot in the preamble signal, when said frame determining unit determines that the frame length is short frame, and to interpolate a data portion in a time direction based on the obtained transmission path characteristics, wherein the short frame is a frame in which a number of symbols in the frame, except for preamble signals existing before said preamble signal in terms of time, is less than an interval of symbols in a same carrier of a discrete pilot arranged in the data portion.

11. A receiving system for receiving an orthogonal frequency division multiplexing (OFDM) signal, each frame of the OFDM signal having a frame length and a plurality of patterns, the system comprising: a processor including:

a transmission path decoding processing portion configured to subject the OFDM signal, which is acquired through a transmission path to transmission path decoding processing including at least decoding processing; and a recording portion configured to record the OFDM signal subjected to the transmission path decoding processing, wherein said transmission path decoding processing portion includes:

an acquiring unit to acquire information regarding a preamble signal from the OFDM signal, which is transmitted from a transmitting apparatus in accordance with an OFDM system;

a frame determining unit to determine whether or not the frame length is short frame based on the information regarding the preamble signal acquired from said acquiring unit; and a time interpolating unit to obtain transmission path characteristics by comparing a pilot in the preamble signal with a previously determined pilot corresponding to said pilot in the preamble, when said frame determining unit determines that the frame length is short frame, and to interpolate a data portion in a time direction based on the obtained transmission path characteristics, wherein the short frame is a frame in which a number of symbols in the frame, except for preamble signals existing before said preamble signal in terms of time, is less than an interval of symbols in a same carrier of a discrete pilot arranged in the data portion.

12. A receiving apparatus for receiving an orthogonal frequency division multiplexing (OFDM) signal each frame of the OFDM signal having a frame length and a plurality of patterns, the apparatus comprising: a processor including:

an acquiring section configured to acquire information regarding a preamble signal from the OFDM signal, which is transmitted from a transmitting apparatus in accordance with an OFDM system;

a frame determining section configured to determine whether or not the frame length of the OFDM signal is short frame based on the information regarding the preamble signal acquired from the acquiring section; and a time interpolating section configured to obtain transmission path characteristics by comparing a pilot in the preamble signal with a previously determined pilot corresponding to said pilot in the preamble signal, when the frame determining section determines that the frame length is short frame, and to interpolate a data portion in a time direction based on the obtained transmission path characteristics, wherein the short frame is a frame in which a number of symbols in the frame, except for preamble signals existing before said preamble signal in terms of time, is less than an interval of symbols in a same carrier of a discrete pilot arranged in the data portion.

* * * * *